United States Patent [19]
Izawa et al.

[11] Patent Number: 5,796,734
[45] Date of Patent: Aug. 18, 1998

[54] SIMULTANEOUSLY-OCCURING MESSAGE CONTROL DEVICE IN A COMMUNICATIONS SYSTEM WHERE A MESSAGE IS TRANSMITTED USING A PLURALITY OF DATA UNITS

[75] Inventors: Naoyuki Izawa; Masami Murayama, both of Kanagawa, Japan

[73] Assignee: Fujitsu Limited, Kanagawa, Japan

[21] Appl. No.: 633,151

[22] Filed: Apr. 16, 1996

[30] Foreign Application Priority Data

Sep. 6, 1995 [JP] Japan ................................. 7-229510

[51] Int. Cl.$^6$ .................................................. H04L 12/02
[52] U.S. Cl. ................................................................ 370/394
[58] Field of Search .................................. 370/389, 394, 370/395, 400, 401, 409, 419

[56] References Cited

U.S. PATENT DOCUMENTS

| | | | |
|---|---|---|---|
| 5,287,535 | 2/1994 | Sakagawa | 370/389 |
| 5,548,593 | 8/1996 | Peschi | 370/94.1 |

FOREIGN PATENT DOCUMENTS

| | | | |
|---|---|---|---|
| 2 254 529 | 10/1992 | United Kingdom . | |
| 94/11974 | 5/1994 | WIPO . | |

*Primary Examiner*—Douglas W. Olms
*Assistant Examiner*—Matthew C. Phillips
*Attorney, Agent, or Firm*—Helfgott & Karas, P.C.

[57] ABSTRACT

A first storage unit stores a reception count, which is the number of simultaneously-occurring messages for each of subscribers corresponding to subscriber identification information. A second storage unit stores a predetermined number of the simultaneously-occurring messages, which is an upper limit of allowing the messages to occur in parallel, for each of the subscribers corresponding to the subscriber identification information. A third storage unit stores each message identification information corresponding to each of the simultaneously-occurring messages, together with the order of occurrence, for each of the subscribers corresponding to the subscriber identification information. A control unit controls transfers of the simultaneously-occurring messages, by controlling the first, second, and third storage means according to the transfer order identification information, the subscriber identification information, and the message identification information extracted from the received data unit.

10 Claims, 18 Drawing Sheets

| DIR. | SNI | | | | | | NNI | | | | | | |
|---|---|---|---|---|---|---|---|---|---|---|---|---|---|
| UPWARD | BUSY | X | X | X | REQ2 | REQ1 | REQ0 | BUSY | DC | DC | DC | DC | DC | DC |
| DOWNWARD | BUSY | 0 | 0 | 0 | 0 | 0 | 0 | BUSY | 0 | 0 | 0 | 0 | 0 | 0 |

UPWARD:
BUSY : CONTAIN INFORMATION = 1, EMPTY = 0
REQ2 : PRIORITY LEVEL 2
REQ1 : PRIORITY LEVEL 1
REQ0 : PRIORITY LEVEL 0
REQUEST FOR SEND = 0, NO REQUEST = 1
X : not processed by the network BUSY : VALID CELL = 1, INVALID CELL = 0
DC : Don't care

DOWNWARD:
BUSY : CONTAIN INFORMATION = 1, EMPTY = 0

BUSY : VALID CELL = 1, INVALID CELL = 0

FIG. 5 PRIOR ART

|  | VCI | PT | SP | HCS |
|---|---|---|---|---|
| IF INFORMATION EXISTS IN L2-PDU | 11111111 11111111 1111 | 00 | 00 | 00100010 |
| IF NO INFORMATION EXISTS IN L2-PDU | 00000000 00000000 0000 | 00 | 00 | 00000000 |

FIG. 6 PRIOR ART

| VALUE | MEANING |
|---|---|
| 00 | CONTINUATION MESSAGE (COM) (EMPTY L2 PDU FROM MSS) |
| 01 | END OF MESSAGE (EOM) |
| 10 | BEGINNING OF MESSAGE (BOM) |
| 11 | SINGLE SEGMENT MESSAGE (SSM) |

F I G. 7 PRIOR ART

| | FIRST MEMORY (RECEPTION COUNT) | SECOND MEMORY (PREDETERMINED MCDU NUMBER) | MATCHER | PREDETERMINED MCDU NUMBER = 1 ? | β = RECEPTION COUNT | PREDETERMINED MCDU NUMBER = RECEPTION COUNT | MATCHER | | FIRST MEMORY (RECEPTION COUNT) | | |
|---|---|---|---|---|---|---|---|---|---|---|---|
| | READ ADDRESS | READ ADDRESS | MATCH SIGNAL | | | | READ ADDRESS (SNI) | WRITE ADDRESS (SNI) / DATA | WRITE ADDRESS / DATA | | |
| SSM RECEPTION | SNI | SNI | O | O | – | – | – | RECEPTION COUNT | RELEASED MID VALUE | SNI | RECEPTION COUNT −1 | CASE 1 |
| | | | | × | O | – | – | RECEPTION COUNT | RELEASED MID VALUE | SNI | RECEPTION COUNT −1 | CASE 2 |
| | | | | × | – | β+1 ≤ RECEPTION COUNT | β ≤ RECEPTION COUNT −1 | READ MID | SNI | RECEPTION COUNT −1 | CASE 3 |
| | | | | | | | RECEPTION COUNT | RELEASED MID VALUE | | | |
| | | | × | O | – | O | – | RECEPTION COUNT | RELEASED MID VALUE | SNI | RECEPTION COUNT −1 | CASE 4 |
| | | | | | | × | – | – | – | – | – | CASE 5 |
| | | | | × | – | O | 2 ≤ RECEPTION COUNT | 1 ≤ RECEPTION COUNT −1 | READ MID | SNI | RECEPTION COUNT −1 | CASE 6 |
| | | | | | | | RECEPTION COUNT | RELEASED MID VALUE | | | |
| | | | | | | × | – | – | – | – | – | CASE 7 |
| ROM RECEPTION | SNI | SNI | O | O | – | – | – | – | – | – | – | CASE 8 |
| | | | | × | O | – | – | – | – | – | – | CASE 9 |
| | | | | × | – | β+1 ≤ RECEPTION COUNT | β ≤ RECEPTION COUNT −1 | READ MID | – | – | CASE 10 |
| | | | | | | | RECEPTION COUNT | NEW MID | | | |
| | | | × | O | – | O | – | RECEPTION COUNT | NEW MID | – | – | CASE 11 |
| | | | | | | × | – | RECEPTION COUNT +1 | NEW MID | SNI | RECEPTION COUNT +1 | CASE 12 |
| | | | | | | O | 2 ≤ RECEPTION COUNT | 1 ≤ RECEPTION COUNT −1 | READ MID | – | – | CASE 13 |
| | | | | | | | RECEPTION COUNT | NEW MID | | | |
| | | | | | | × | – | RECEPTION COUNT +1 | NEW MID | SNI | RECEPTION COUNT +1 | CASE 14 |
| EOM RECEPTION | SNI | SNI | O | O | – | – | – | RECEPTION COUNT | RELEASED MID VALUE | SNI | RECEPTION COUNT −1 | CASE 15 |
| | | | | × | O | – | – | RECEPTION COUNT | RELEASED MID VALUE | SNI | RECEPTION COUNT −1 | CASE 16 |
| | | | | × | – | β+1 ≤ RECEPTION COUNT | β ≤ RECEPTION COUNT −1 | READ MID | SNI | RECEPTION COUNT −1 | CASE 17 |
| | | | | | | | RECEPTION COUNT | RELEASED MID VALUE | | | |
| | | | | | | | | | | | | CASE 18 |

SIMULTANEOUSLY-OCCURING MESSAGE CONTROL DEVICE IN A COMMUNICATIONS SYSTEM WHERE A MESSAGE IS TRANSMITTED USING A PLURALITY OF DATA UNITS

BACKGROUND OF THE INVENTION

1. Field of the Invention

The present invention relates to a method for controlling simultaneously-occurring messages in a communications system where one message (L3-PDU) is transmitted using one or a plurality of data units (L2-PDUs), in the similar manner as in an SMDS system.

2. Description of the Related Art

As a broadband connectionless data service intended to implement a connection between LANs, for example, the SMDS (Switched Multi-megabit Data Service) system is known.

Since the broadband connectionless data service processes connectionless data from a great number of subscribers, it is vital to process the subscribers' data effectively.

FIG. 1 is a block diagram showing a conventional SMDS system.

In the SMDS system, as shown in FIG. 2, an SMDS service data unit, which is the communications data (user data), is stored in a payload part of a variable-length packet called an L3-PDU (Level 3 Protocol Data Unit) message. The L3-PDU message is then divided into one or a plurality of segments respectively composed of 44 octets at a subscriber terminal in a transmitting side. One or the plurality of segments are respectively re-assembled into one or the plurality of L2-PDUs stored in each payload, and the reassembled L2-PDUs are then transmitted.

The L2-PDU is a packet of a fixed-length similar to a cell for use in an ATM (Asynchronous Transfer Mode) method. A header (HDR) for storing address information and various types of identification information is placed at the beginnings of the L2-PDU and the L3-PDU, while a trailer (TRLR) for storing a bit sequence for error checking, etc. is placed at the ends of the L2-PDU and the L3-PDU.

The SMDS service data unit provided by a subscriber is processed according to an SNI (Subscriber Network Interface). The subscriber is provided with a DS1 subscriber line 101 operating at a transfer rate of 1.5 Mbps and a DS3 subscriber line 103 operating at the transfer rate of 45 Mbps, as physical transmission channels. The subscriber terminal divides the L3-PDU for use in the SMDS system into one or a plurality of L2-PDUs, converts the format of the L2-PDUs into that suitable for the DS1 subscriber line or the DS3 subscriber line 103 (which will be described later), and outputs the L2-PDUs in the converted format to each subscriber line.

The DS1 subscriber line 101 and the DS3 subscriber line 103 respectively terminate at a DS1 terminal 102 at a DS3 terminal 104, from which the L2-PDUs are extracted.

The L2-PDU provided by the subscriber is attached with a semi-fixed VCI (Virtual Channel Identifier) and a VPI (Virtual Path Identifier) corresponding to the SMDS system, to be described later. The DS1 terminal 102 and the DS3 terminal 104 extract the L2-PDU with the semi-fixed VPI/VCI attached, replaces the VPI/VCI with the semi-fixed VPI/VCI corresponding to each SNI at which each terminal terminates, and outputs the L2-PDU with the VPI/VCI replaced to a switch 108, as will be described later.

The switch 108 is implemented as an ATM switch in most cases. In this case, the L2-PDU is converted into an ATM cell, and output to the switch 108. Since both the L2-PDU and the ATM cell are packets of almost the same fixed data length, to be described later, they are very similar.

The L2-PDU (ATM cell) output from the DS1 terminal 102 or the DS3 terminal 104 is input to the switch 108 via a multiplexer/demultiplexer 105, 106, or 107. The switch 108 transfers the L2-PDU with the semi-fixed VPI/VCI for identifying as the DS1 terminal 102 or the DS3 terminal 104 attached to an SMDS line part (LP) 113.

The LP 113 is connected to the switch 108 via a highway operating at the transmission rate of 622 Mbps. The LP 113 can handle a plurality of SNIs accommodated by a station including the LP 113. The number of LPs 113 depending on a scale of the station are connected to the switch 108 via the highway 116.

The LP 113 can identify from which SNI (which DS1 terminal 102 or DS3 terminal 104) the L2-PDU is input, by identifying the semi-fixed VPI/VCI attached to the L2-PDU that the LP 113 receives, according to an instruction given by a control unit 109. The LP 113 then extracts a source address (SA) and a destination address (DA) from the transferred message (L3-PDU) using one or the plurality of L2-PDUs. If the destination address (DA) is within a station, the LP 113 replaces the VPI/VCI of each L2-PDU where the above described message is divided and stored, with the semi-fixed VPI/VCI of the DS1 terminal 102 or the DS3 terminal 104 within the station corresponding to the destination address (DA). If the destination address (DA) is outside the station, the LP 113 finds out the LP of the destination station, and replaces the VPI/VCI of each L2-PDU where the above described message is divided and stored, with the VPI/VCI corresponding to the source address and the LP of the destination station. Then, the LP 113 returns each L2-PDU to the switch 108.

Each switch module (not shown in the attached drawings), which is included in the switch 108 switches the received L2-PDU rapidly.

If the L2-PDU input from the LP 113 is directed within the station, it is transferred to the subscribers within the station via the switch 108, multiplexer/demultiplexer 107, 106, or 105, the DS1 terminal 102 or the DS3 terminal 104, and the DS1 subscriber line 101 or the DS3 Subscriber line 103. If the L2-PDU is not directed within the station, it is transferred to the LP 113 of the destination station via the switch 108, multiplexes/demultiplexes 110, a terminator (FINF) 111, and an interoffice trunk line 112.

The LP 113 of the destination station identifies the destination address (DA) of the transferred message using one or the plurality of L2-PDUs that the LP 113 receives in order to verify that the message is addressed to within the station. After that, the LP 113 replaces the VPI/VCI of each L2-PDU storing the message, with the semi-fixed VPI/VCI of the DS1 terminal 102 or the DS3 terminal 104 corresponding to the destination address (DA), and outputs each L2-PDU to the switch 108. Each L2-PDU is transferred to the subscribers within the station via the switch 108, the DS1 terminal 102 or the DS3 terminal 104, and the DS1 subscriber line 101 or the DS3 subscriber line 103.

If the L3-PDU is divided into a plurality of L2-PDUs as shown in FIG. 2, the first L2-PDU is called a BOM (Beginning Of Message), the last L2-PDU is called an EOM (End Of Message), and the intermediate L2-PDUs are called COMs (Continuation Of Message). If the L3-PDU is included in one L2-PDU, it is called an SSM (Single Segment Message). The BOM, COM, EOM and SSM are called segment types, which are set up in a header of the corresponding L2-PDU.

In the meantime, the subscriber terminal in the transmitting side appends the above described source address (SA) and the destination address (DA) to the header in addition to the SMDS service data unit in the L3-PDU. The source address (SA) and the destination address (DA) included in the L3-PDU are stored in the first L2-PDU having the BOM attribute.

Furthermore, the subscriber terminal in the transmitting side on one SNI appends identification information called an MID (Message IDentifier) of the same value to the header of one or the plurality of the L2-PDUs forming one L3-PDU.

After the LP 113 extracts the source address (SA) and the destination address (DA) from the L2-PDU having the BOM attribute for every SNI of each L2-PDU, it stores the MID attached to the L2-PDU and the VPI/VCI corresponding to the destination address (DA) as table data. After that, every time the LP 113 receives the L2-PDU having the COM or EOM attribute from the switch 108, it extracts the SNI number and the MID from the L2-PDU, extracts the VPI/VCI corresponding to the SNI number and the MID from the above described table data, replaces the VPI/VCI of the received L2-PDU with the extracted VPI/VCI, and transmits the L2-PDU with the VPI/VCI replaced to the switch 108. After the LP 113 processes the L2-PDU having the EOM attribute received from the switch 108, it removes the table data corresponding to the SNI number and the MID stored in the L2-PDU. As a result, the subscriber terminal in the transmitting side on the SNI can utilize the value of the above described MID for another L3-PDU.

As described above, the SMDS system identifies only the header of each L2-PDU in real time and transmits the L2-PDU without identifying the transmitted L3-PDU including the SMDS service data unit, which is the subscriber information, thereby implementing high-speed connectionless communications.

FIG. 3 shows an example of the mapping of the ATM cell which is the data format of the switch 108 side and the DS3 format which is the data format of the transmitting side, on the DS3 line interface of the DS3 subscriber line 103 at which the DS3 terminal 104 terminates. As described above, the SMDS service data unit, which is the communications data (user data), is stored in a payload of an L3-PDU at a subscriber terminal in the transmitting side. After the L3-PDU is divided into one or a plurality of segments respectively composed of 44 octets, the one or the plurality of segments are reassembled into one or a plurality of L2-PDUs stored in each payload. In FIG. 3, the subscriber terminal in the transmitting side firstly forms a DS3PLCP frame corresponding to a PLCP layer using the L2-PDU, secondly forms a subframe using the DS3PLCP frame, and lastly forms a multiframe using the subframe. The formed multiframe is used as the data format of the DS3 subscriber line 103 shown in FIG. 1.

FIG. 4 shows the format of the L2-PDU. As shown in FIGS. 3 and 4, the L2-PDU is composed of a header (HEADER) of 7 octets, information field (INFO.FIELD) of 44 octets, and a trailer (TRAILER) of 2 octets.

An access control field (Access Control shown in FIG. 4 or the ACF shown in FIG. 3) included in a header (HEADER) in FIG. 4 is used to check a transmission state of the L2-PDU in a transmission channel terminating at the DS3 terminal 104.

FIG. 5 shows the contents of the access control field in an upward transmission channel or a downward transmission channel, if the transmission channel to which the DS3 terminal 104 is connected is an SNI (Subscriber Network Interface), and if the transmission channel is an NNI (Network Node Interface).

In this figure, if the transmission channel to which the DS3 terminal 104 is connected is the SNI (DS3 subscriber line 103 shown in FIG. 1), a BUSY bit indicates if the L2-PDU including that bit stores information. If the transmission channel to which the DS3 terminal 104 is connected is the SNI, and it is the upward transmission channel (transmission channel for inputting to an ATM switch side) at the same time, bits such as REQ0, REQ1, and REQ2 indicate priority levels. If the transmission channel to which the DS3 terminal 104 connected is the NNI, the BUSY bit indicates if the L2-PDU including that bit is a valid cell.

A network control information field (NETWORK CONTROL INFO shown in FIG. 4 or NCI in FIG. 3) included in the header shown in FIG. 4 is 32-bit data, which consists of a 20-bit VCI, 2-bit PT, 2-bit SP, and 8-bit HCS as shown in FIG. 6. If the L2-PDU includes information, all of the bits of the VCI are "1". Otherwise, all of them are "0". The bits of the PT (Payload Type) and that of the SP (Segment Priority) are currently "0 0".

The HCS (Header Check Sequence) is the value obtained by calculating the generating polynomial ($G(x)=X^8+X^2+X+1$) for a data part of 3 octets consisting of the VCI, PT, and SP in the network control information field. By taking advantage of the obtained value, the error checking is made for the network control information field. The 3 octets composed of the VCI, PT, and SP can only adopt two fixed values as shown in FIG. 6. Accordingly, if the L2-PDU includes the information, the HCS has the value of "00100010". Otherwise, it has the value of "00000000".

FIG. 7 shows the combinations of the values and the segment types (SEGMENT TYPE shown in FIG. 4 or SEGT shown in FIG. 3) included in the header shown in FIG. 4. If the segment type of the L2-PDU is the COM (Continuation Of Message), EOM (End Of Message), BOM (Beginning Of Message), or SSM (Single Segment Message), its value is "00", "01", "10", or "11" in 2 bits, respectively.

For the message identifier (MESSAGE IDENTIFIER shown in FIG. 4, or MID shown in FIG. 3) in the header shown in FIG. 4, the explanation is provided above.

In FIG. 4, the segmentation unit (SEGMENTATION UNIT shown in FIG. 4 or SEG.UNIT shown in FIG. 3), which is the information field (INFO.FIELD), stores the L3-PDU (L3 protocol data unit) for use in the SMDS system, as described above by referring to FIG. 2.

The payload length (PAYLOAD LENGTH shown in FIG. 4 or PLEN shown in FIG. 3) included in the trailer (TRAILER) shown in FIG. 4 stores a length of valid data included in the segmentation unit. If the L2-PDU is the BOM or COM type, the payload length is equal to 44. If the L2-PDU is either the EOM or SSM type, the payload length is equal to or less than 44. If the L2-PDU includes no information, the payload length is equal to 00.

The payload CRC (PAYLOAD CRC shown in FIG. 4 or PCRC shown in FIG. 3) is the value obtained by calculating a generating polynomial ($G(X)=X^{10}+X^9+X^5+X^4+X+1$) for a data part of 48 octets composed of the SEGMENT TYPE, MESSAGE IDENTIFIER, SEGMENTATION UNIT, PAYLOAD LENGTH, and PAYLOAD CRC. By taking advantage of the obtained value, an error checking is made for the above described data part of 48 octets. If the L2-PDU includes no information, the value of the PAYLOAD CRC becomes "00".

After the L2-PDU structured as described above is reassembled in the subscriber terminal in the transmitting side, it is inserted into the DS3PLCP frame corresponding to the PLCP layer (PLCP LAYER) shown in FIG. 3. FIG. 8 shows the format of the DS3PLCP frame corresponding to the PLCP layer (PLCP LAYER) shown in FIG. 3. In this case, each of the octets in this frame is sequentially transmitted in 4-bit nibbles.

Then, the subframe shown in FIG. 3 is generated from the above described DS3PLCP frame. FIG. 9 shows the detailed structures of the various subframes. One subframe is composed of 8 blocks of 85 bits. The first bit at the beginning of the 85-bit block is a DS3 overhead portion, and the remaining 84 bits are an information payload portion (INFO.PAYLOAD), into which the DS3PLCP frame is inserted.

Lastly, 7 subframes are merged into one multiframe as shown in FIG. 3 or FIG. 9. The DS3 line interface transmits one multiframe in 106.4 μsec (microseconds) cycles at a bit rate of 44.736 MHz.

There is no need to synchronize the beginning of the multiframe or the subframe in the DS3 frame format shown in FIG. 3 with the beginning of the DS3PLCP frame.

The DS3 terminal 104 shown in FIG. 1 extracts the subframe from the above described multiframe input from the transmission channel, extracts the DS3PLCP frame from the subframes, and further extracts the L2-PDU from the DS3PLCP frame.

Then, the DS3 terminal 104 performs the HCS (HEC) checking for the header of the L2-PDU, and converts the 53-octet L2-PDU into an 54-octet ATM which can be processed in the switch 108 (See FIG. 10). In this case, as shown in FIG. 3, the segment type (SEGT) and the message identifier (MID) included in the header of the L2-PDU, and the segmentation unit (SEG.UNIT), the payload length (PLEN), and the payload CRC (PCRC) included in the payload part of the L2-PDU, are stored in the payload part of the ATM cell (ATM CELL PAYLOAD). Additionally, the VCI where all of the 20 bits of the network control information field (NC) in the header of the L2-PDU are "1", identifies a PVC (Permanent Virtual Circuit) connection made between the DS3 terminal 104 and the SMDS line part (LP) 113, and it is replaced with the VPI/VCI for identifying as an SNI, which is the DS3 transmission channel connected with the DS3 terminal transmitting the ATM cell. The DS3 terminal 104 attaches a tag at the beginning of the ATM cell so that the ATM cell can be self-switched and transferred to the LP 113.

FIG. 11 shows the above described relationship of the conversion between the L2-PDU and the ATM cell.

The LP 113 connected to the switch 108 for providing the SMDS service receives the ATM cell having the VPI/VCI value specific to the PVC used for the SMDS service in the header among the ATM cells input from the switch 108, and performs the above described processing for the L2-PDU stored in the payload part of the ATM cell as shown in FIG. 10.

In a user terminal in a receiving side which performs communications using the DS3 transmission channel, the PLCP frame is extracted from the DS3 frame received from the DS3 transmission channel, and the L2-PDU is extracted from the PLCP frame. Then, the contents of the segmentation unit in the payload portion of the L2-PDU is extracted, and the L3-PDU is assembled according to the MID attached at the header of the L2-PDU. Lastly, the communications data (user data) is extracted from the payload portion of the L3-PDU.

For the above described SMDS system, a restriction must be imposed on the number of the L3-PDUs the LP 113 processes in parallel for every SNI, in order to prevent complicated management of the connections in the LP 113. Processing the L3-PDUs in parallel means that the L2-PDU having the BOM attribute corresponding to one L3-PDU may be received before the transfer of the L2-PDU having the EOM attribute corresponding to another L3-PDU is completed. Such a state can occur not only when a subscriber terminal in a transmitting side on one SNI transmits a plurality of L3-PDUs in parallel, but also when the L2-PDU having the EOM attribute corresponding to one L3-PDU for one SNI is discarded in a network.

In the meantime, each time the LP 113 receives the L2-PDU having the BOM attribute corresponding to one L3-PDU, it extracts the SNI number and the MID to generate the table data corresponding to the SNI number and the MID. After that, the LP 113 holds that table data until it receives the L2-PDU having the EOM attribute with the same SNI number and MID attached.

Assume that the LP 113 receives the L2-PDU having the BOM attribute with the same combination of the SNI number and the MID as that stored as the table data attached, or the L2-PDU having the SSM attribute. In this case, the subscriber terminal in the transmitting side on the SNI corresponding to the above described SNI number releases the MID upon completion of the transmission of the L2-PDU having the EOM attribute with the above described MID attached, and transmits a new L2-PDU having the BOM or SSM attribute with that MID attached. That is, this case may arise when the L2-PDU having the EOM attribute with the combination of the SNI number and the MID attached is discarded in the network. The LP 113 should take appropriate action in such a case.

Conventionally, there was no solution to the above described problem.

Not only for the SMDS system, but also for a communications system where one message is transmitted using one or a plurality of data units, and an identifier for identifying a message is attached to each data unit, it is therefore desirable to solve the above described problem in some manner.

SUMMARY OF THE INVENTION

This invention is developed in consideration of the above described background, and intended to properly control simultaneously-occurring messages in a communications system where one message is transmitted using one or a plurality of data units, each of which has an identifier attached for identifying a message.

The present invention assumes the communications system where one message of a subscriber is transmitted using one or a plurality of data units, each of which is attached with subscriber identification information for identifying the subscriber, message identification information for identifying the message corresponding to each data unit, and transfer order identification information for identifying a transfer order of the data units in the message corresponding to each data unit.

The communications system according to the present invention comprises: a first storage unit for storing a reception count, which is the number of simultaneously-occurring messages, for each of subscribers corresponding to the subscriber identification information; a second storage unit for storing a predetermined number of simultaneously-occurring messages which is the upper limit of messages that can occur in parallel, for each of the subscribers corresponding to the subscriber identification information; a third storage unit for storing each piece of message identification information corresponding to each of the simultaneously-occurring messages, together with the order of occurrence, for each of the subscribers corresponding to the subscriber identification information; and a control unit for controlling the transfer of the simultaneously-occurring messages, by controlling the first, the second, and the third storage unit, according to the transfer order identification information, the subscriber identification information, and the message identification information extracted from the received data unit. With this configuration according to the present invention, if some of the simultaneously-occurring messages include the same message identification information, for example, each data unit can be properly transferred, for example, by aborting the transfer of the data unit corresponding to the preceding message.

Also with the configuration according to the present invention, for example, the predetermined number of simultaneously-occurring messages and the reception count for each message and for each subscriber are compared among the simultaneously-occurring messages, and the predetermined number of the simultaneously-occurring messages for each message can be properly controlled, by aborting the transfer of the data unit corresponding to the message whose transfer was started earliest, according to the comparison results.

BRIEF DESCRIPTION OF THE DRAWINGS

One skilled in the art can easily understand additional features and objects of this invention from the description of the preferred embodiments and with reference to the attached drawings. In the drawings:

FIG. 5 shows a format of the DS3PLCP frame;

FIG. 6 shows a format of the DS3-SMDS L2-PDU;

FIG. 7 shows the contents of an access control field;

FIG. 14 is a table showing the operations performed in the preferred embodiment of the present invention;

DESCRIPTION OF THE PREFERRED EMBODIMENTS

Description of the Principle

Figure 12:
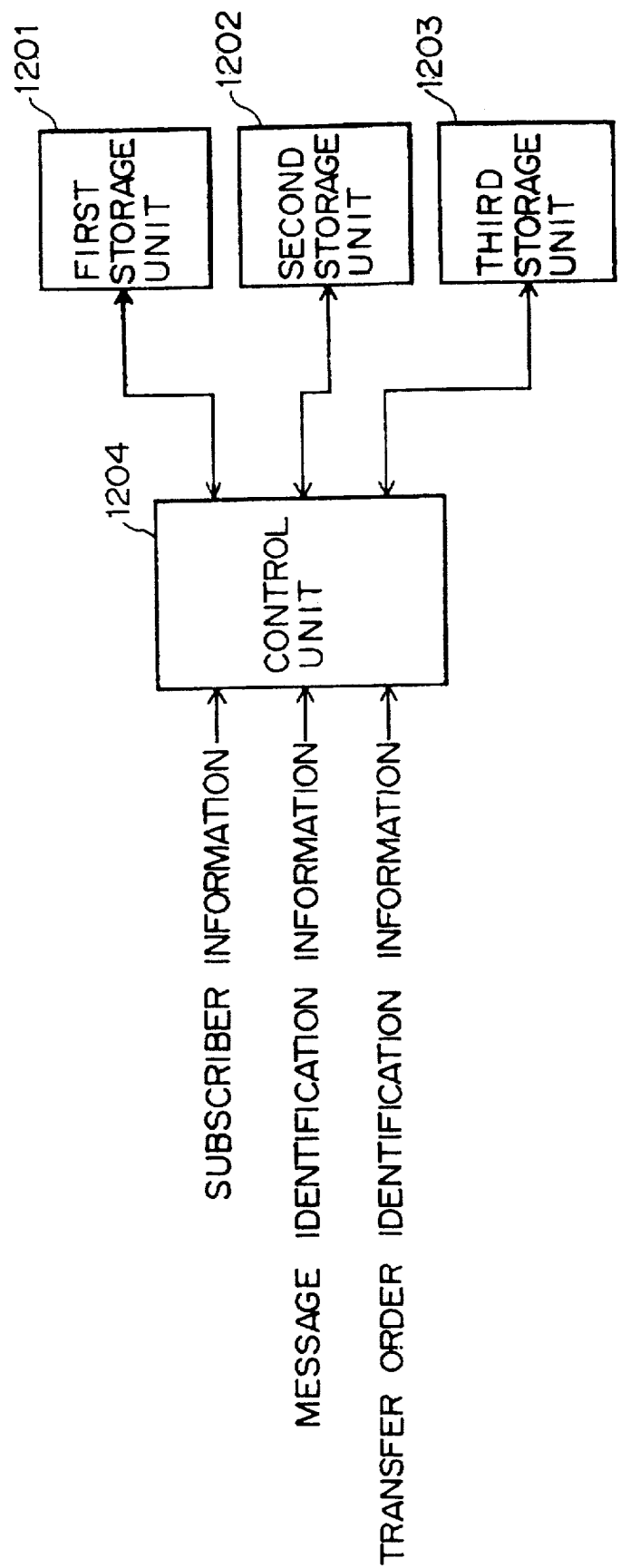
FIG. 12 is a block diagram showing the principle of the present invention.

FIG. 12 is a block diagram showing the principle of the present invention.

The present invention assumes a communications system where one subscriber message (L3-PDU) is transmitted using one or a plurality of data units (L2-PDUs), each of which has subscriber identification information attached (SNI number) for identifying a subscriber, message identification information (MID) for identifying a message corresponding to each data unit, and transfer order identification information (segment type) for identifying a transfer order of each data unit in a message corresponding to each data unit.

A first storage unit 1201 (first memory 1304 in FIG. 13) stores a reception count which is the number of simultaneously-occurring messages for each of subscribers corresponding to the subscriber identification information.

A second storage unit 1202 (second memory 1305) stores a predetermined number of the simultaneously-occurring messages (a predetermined number of MCDUs), which is the upper limit of the messages that can occur in parallel, for each of the subscribers corresponding to the subscriber identification information.

A third storage unit 1203 (matcher 1306) stores each piece of the message identification information corresponding to each of the simultaneously-occurring messages, together with the order of occurrence, for each of the subscribers corresponding to the subscriber identification information.

A control unit 1204 (a portion implemented by the entire configuration shown in FIG. 13) controls the transfers of the simultaneously-occurring messages, by controlling the first storage unit 1201, the second storage unit 1202, and the third storage unit 1203 according to the transfer order identification information, the subscriber identification information, and the message identification information extracted from a received data unit.

Specifically, for example, if the transfer order identification information extracted from the received data unit indicates that the received data unit is the first data unit of the corresponding message, if the transfer order identification information retrieved from the received data unit indicates that the received data unit stores the whole of the corresponding message, and if the transfer order identification information extracted from the received data unit indicates that the received data unit is the last data unit of the corresponding message, the control unit 1204 controls duplicate message identification information of the simultaneously-occurring messages, by determining whether or not the third storage unit holds the message identification information corresponding to the message identification information extracted from the received data unit for the subscriber indicated by the subscriber identification information extracted from the received data unit, and updating the contents of the third storage unit 1203 and the first storage unit 1201 according to the determination result.

Additionally, for example, if the transfer order identification information extracted from the received data unit indicates that the received data unit is the first data unit of the corresponding message, if the transfer order identification information extracted from the received data unit indicates that the received data unit stores the whole of the corresponding message, and if the transfer order identification information extracted from the received data unit indicates that the received data unit is the last data unit of the corresponding message, the control unit 1204 controls the number of the simultaneously-occurring messages, by making a comparison between the reception count stored in the first storage unit 1201 corresponding to the subscriber indicated by the subscriber identification information extracted from the received data unit, and the predetermined number of simultaneously-occurring messages stored in the second storage unit corresponding to the subscriber indicated by the subscriber identification information extracted from the received data unit, and updating the contents of the third storage unit 1203 and the first storage unit 1201 according to the comparison result.

With the above described mechanism according to the present invention, if some of the simultaneously-occurring messages have the same message identification information, for example, each data unit can be properly transferred by aborting the transfer of the data unit corresponding to the preceding message.

In addition, the number of the simultaneously-occurring messages for each of the messages can be properly controlled, by making a comparison between the predetermined number of simultaneously-occurring messages and a reception count for each of the subscribers and each of the messages, and aborting the transfer of the data unit corresponding to the message whose transfer was started earliest, according to the comparison result.

DESCRIPTION OF THE PREFERRED EMBODIMENT

Detailed explanation about the preferred embodiment of the present invention is hereinafter provided, referring to the drawings.

Figure 1:
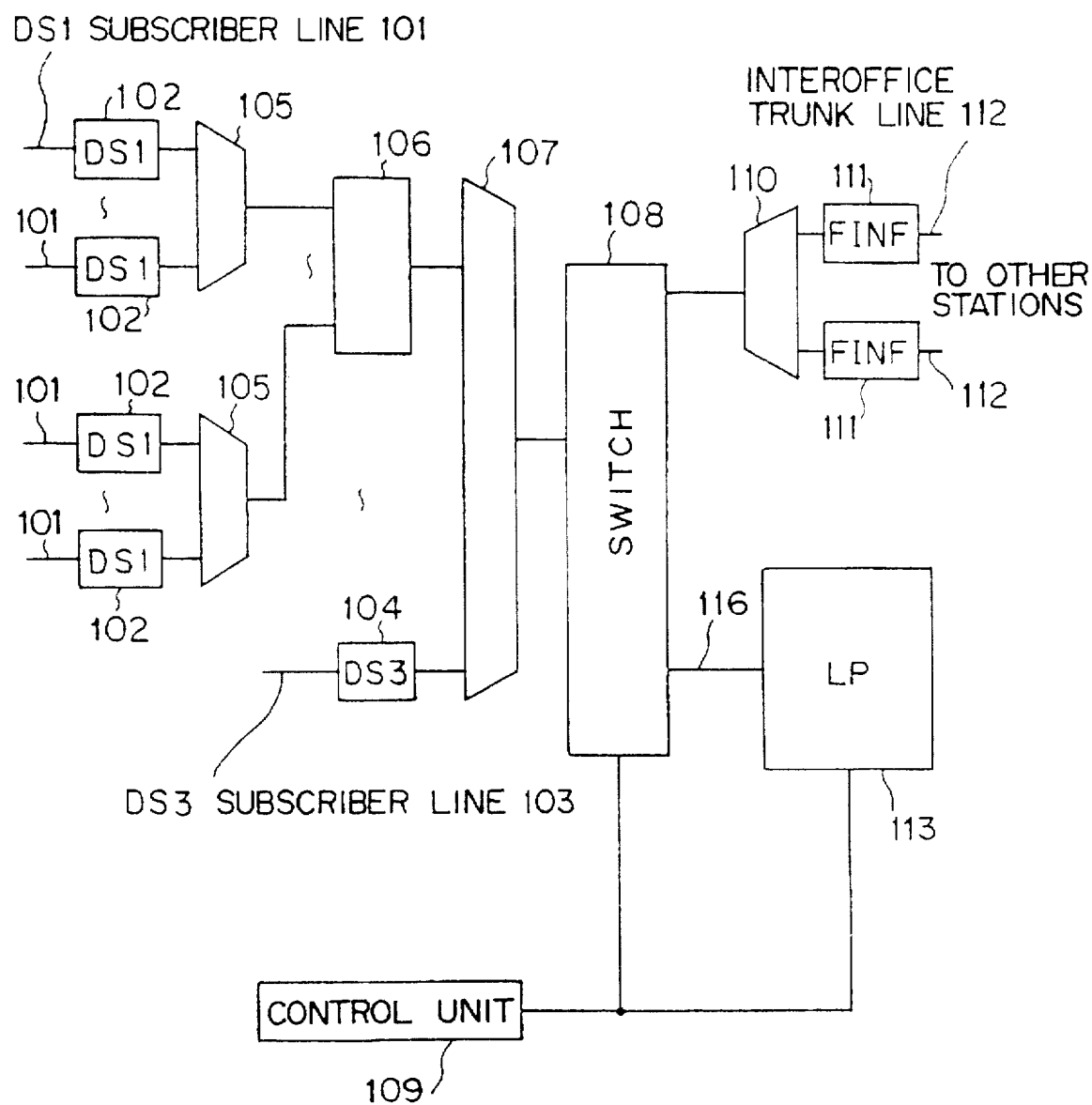
FIG. 1 is a block diagram showing the conventional configuration of an SMDS system.
Figure 2:
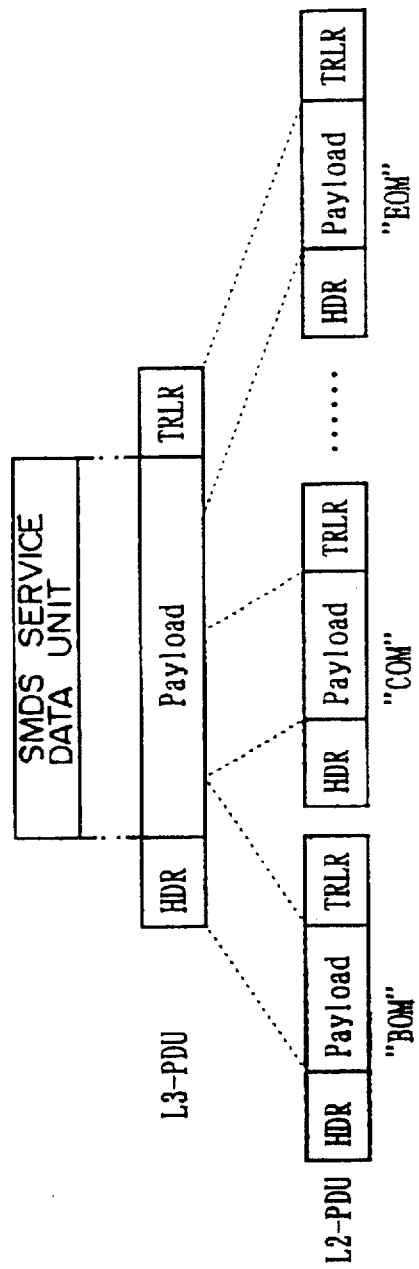
FIG. 2 is a block diagram showing the relationship between the L3-PDU and the L2-PDU.
Figure 3:
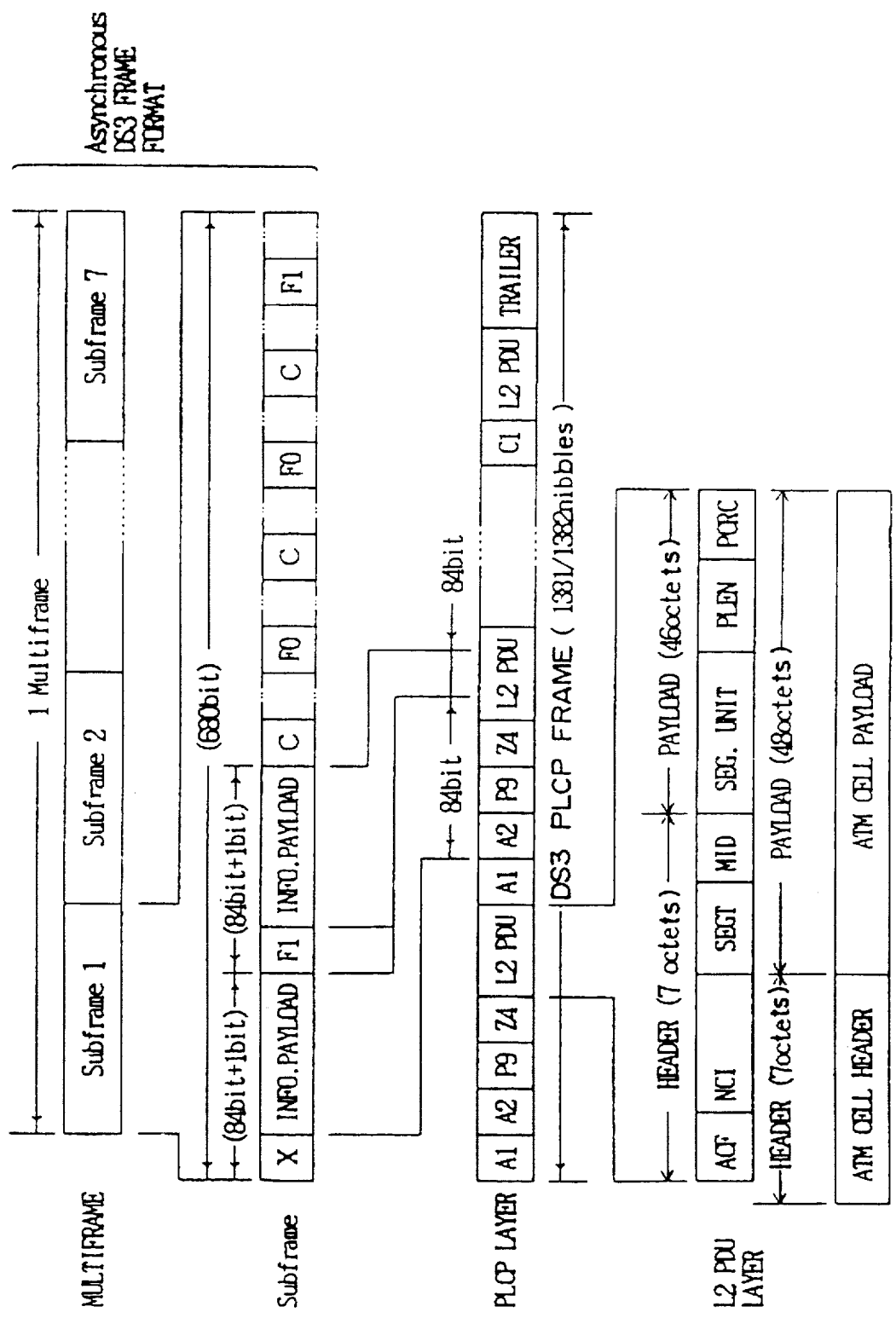
FIG. 3 shows the mapping of the ATM cell payload converted to the DS3 format.
Figure 4:
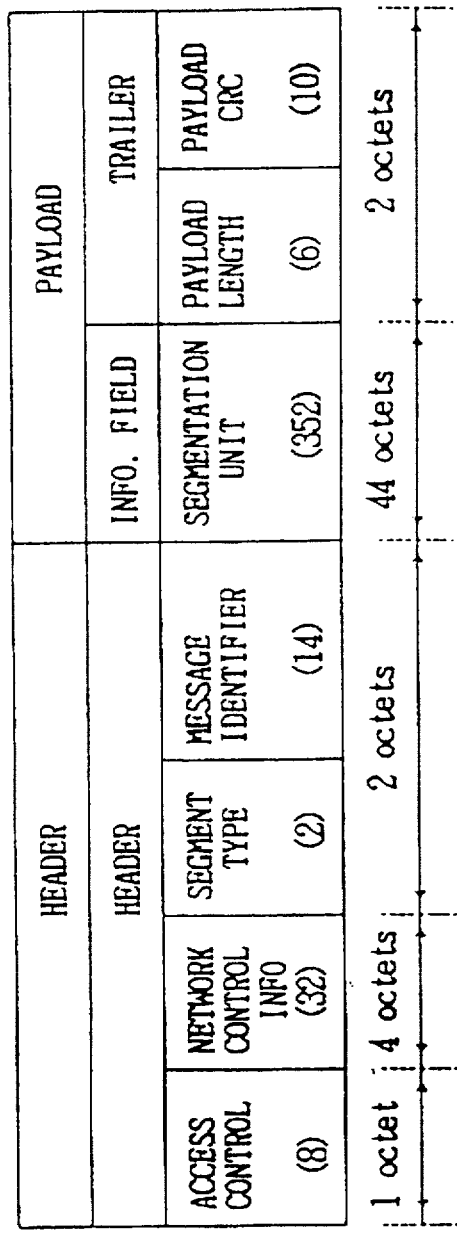
FIG. 4 shows a format of the DS3 frame.
Figure 8:
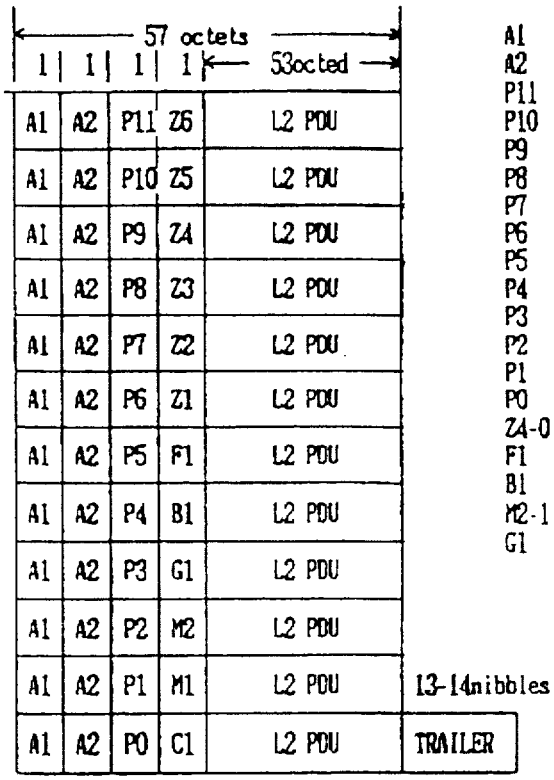
FIG. 8 shows the contents of a network control information field.
Figure 9:
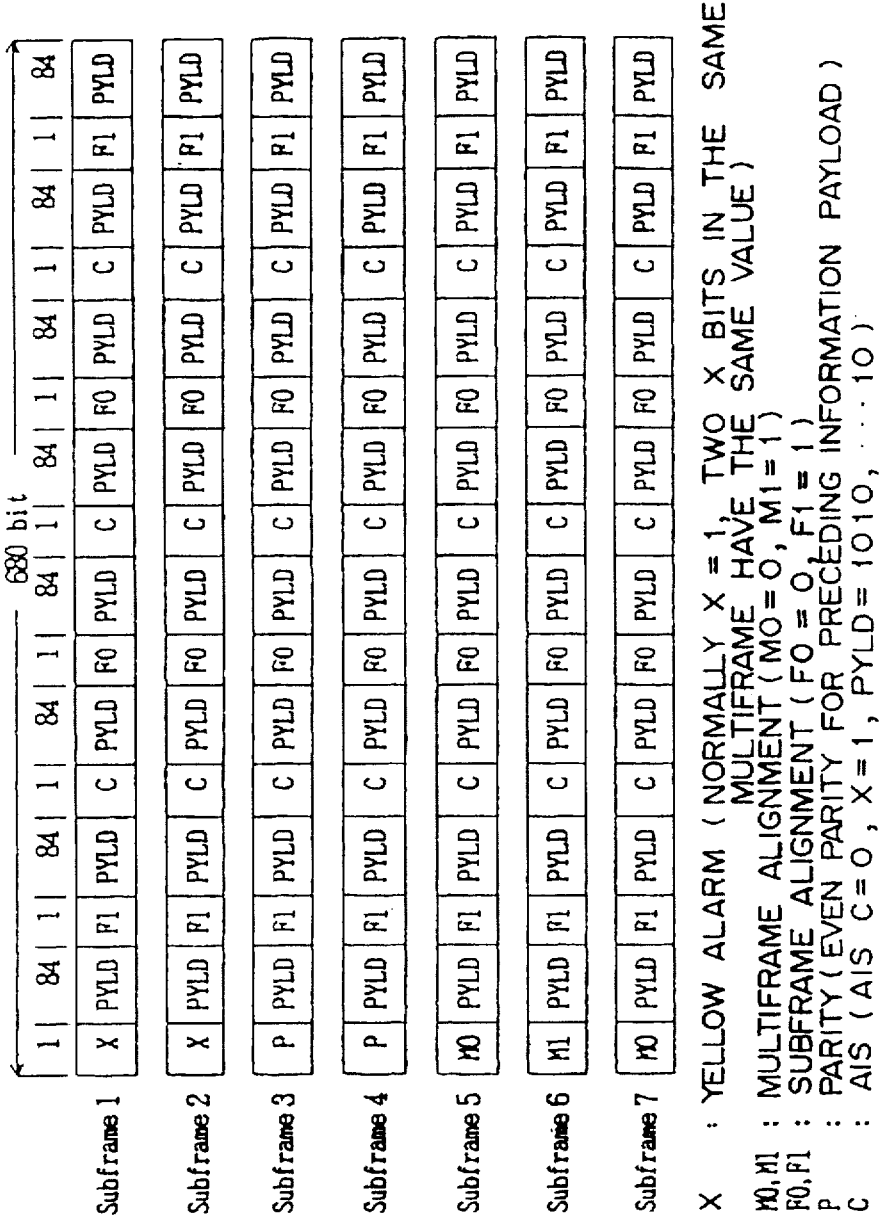
FIG. 9 shows the structures of segment types.
Figure 10:
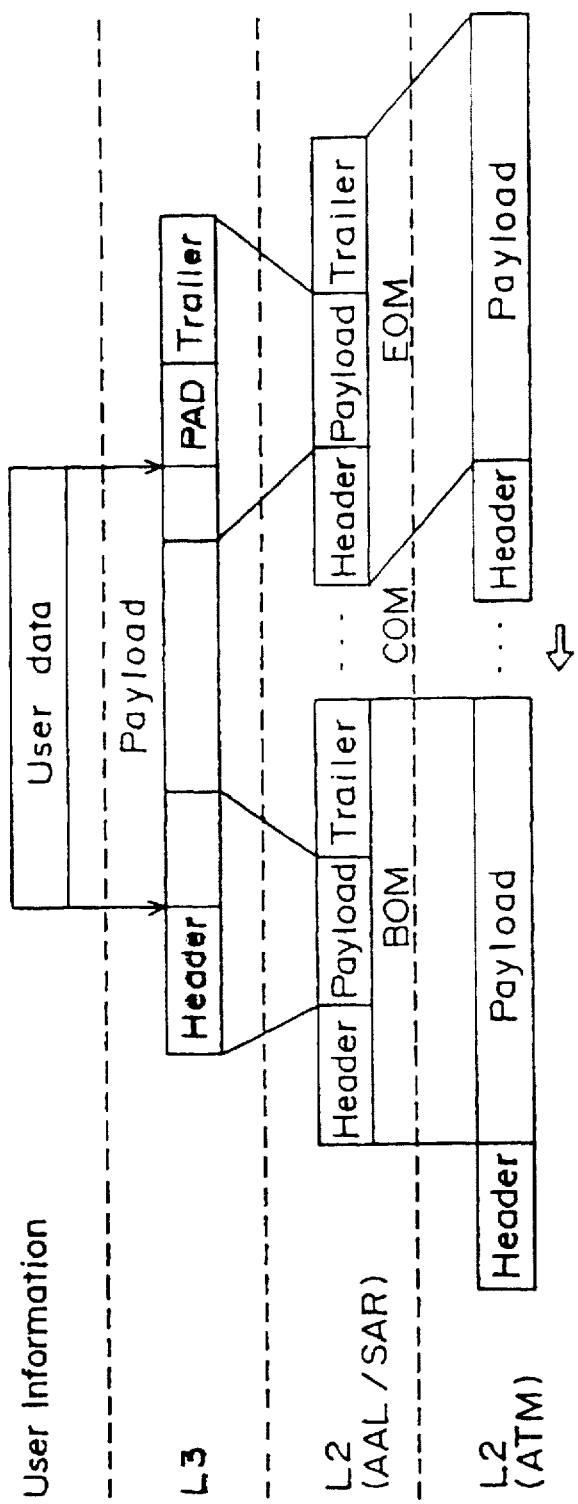
FIG. 10 shows the hierarchical structure of the SMDS service.
Figure 11:
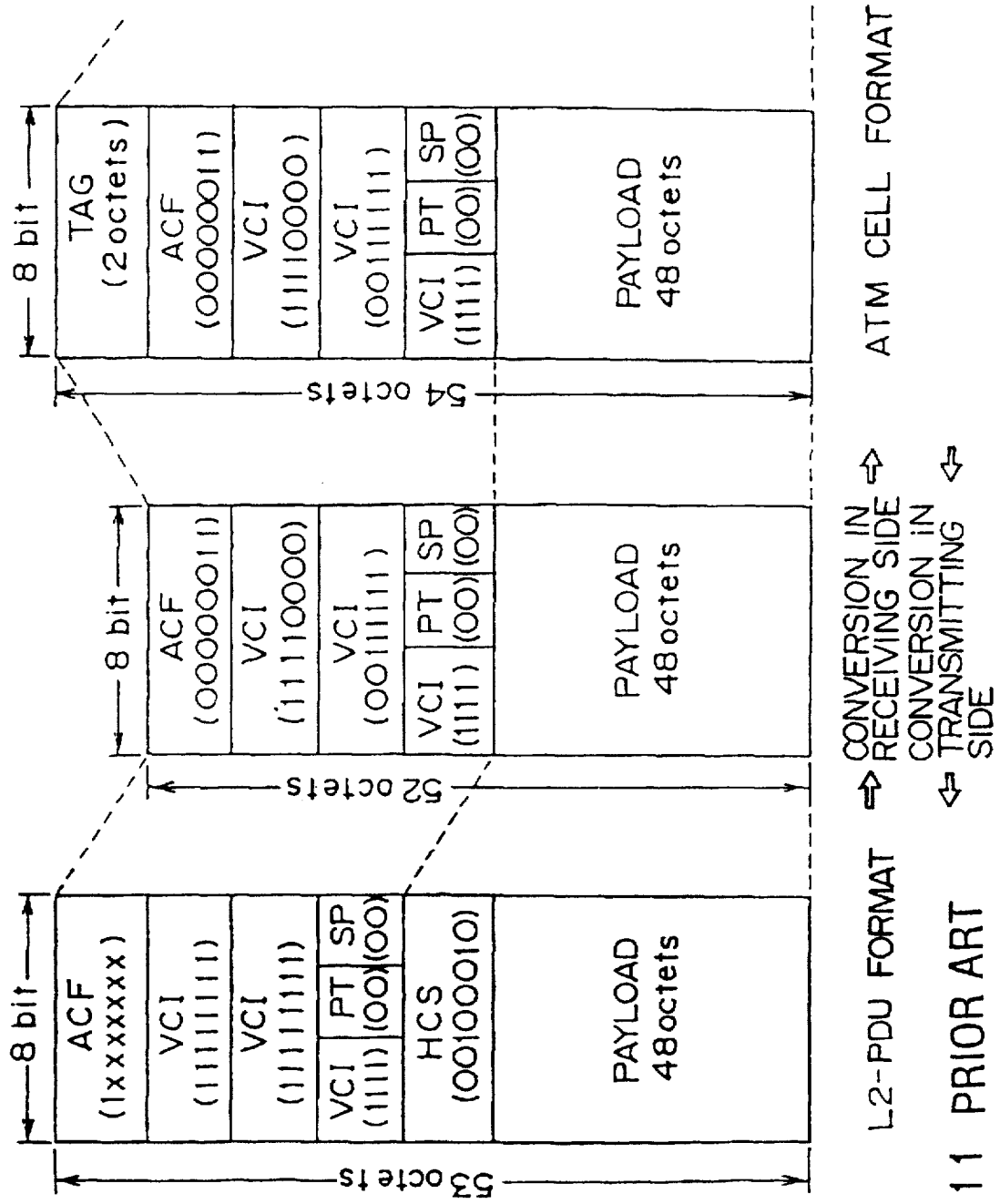
FIG. 11 is a schematic diagram showing the data conversion process between the DS3 terminal and the LP.

The entire configuration of the SMDS system targeted by the embodiment of the present invention is the same as that previously shown in FIG. 1.

Figure 13:
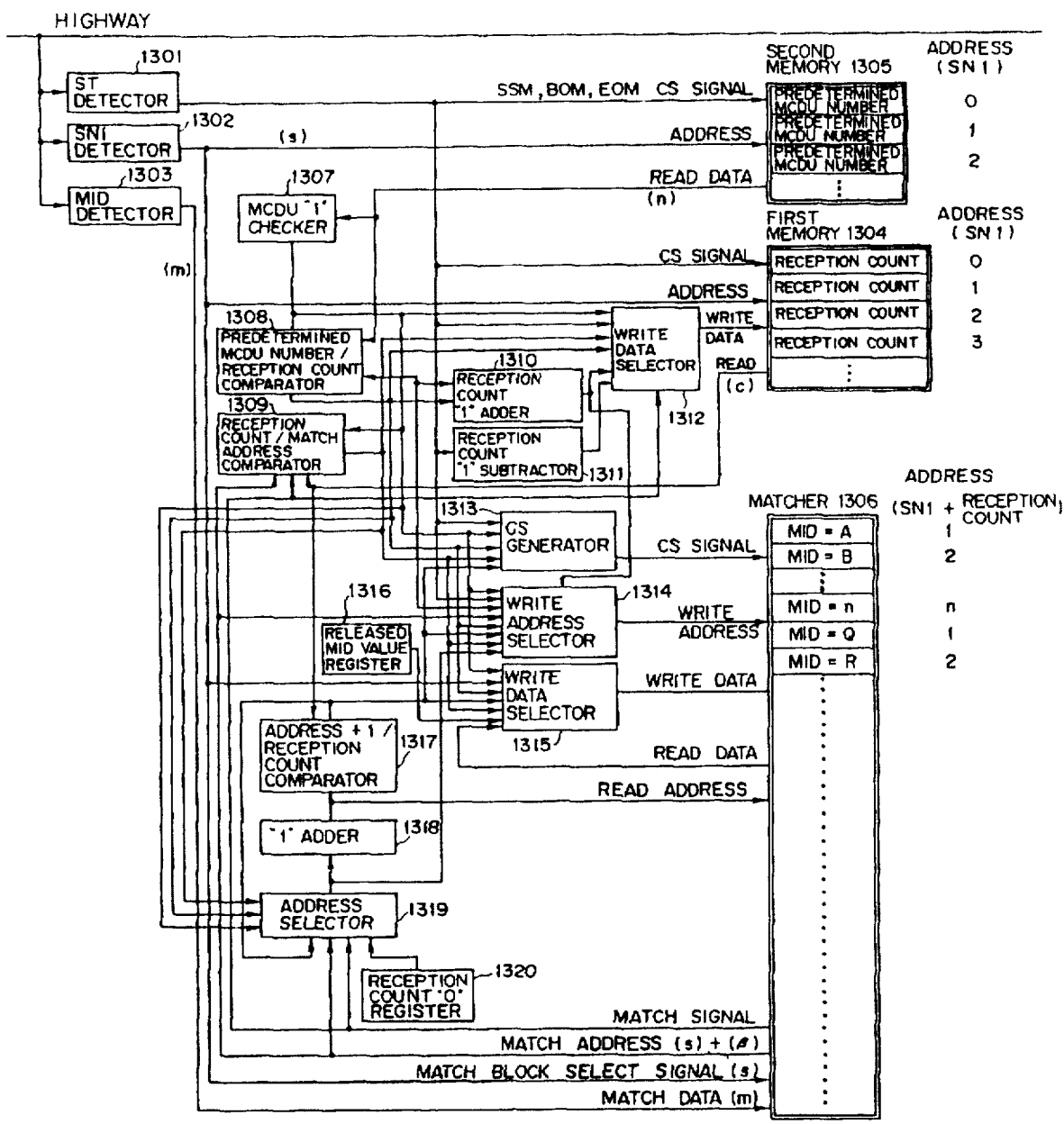
FIG. 13 is a block diagram showing the preferred embodiment of the present invention.

FIG. 13 is a block diagram showing the configuration of the preferred embodiment of the present invention arranged in the LP 113 shown in FIG. 1.

An ST detector 1301 detects a segment type set in a header of an L2-PDU received from a highway connected to the switch 108 shown in FIG. 1. The segment types include the BOM, the COM, the EOM, and the SSM types.

An SNI detector detects an SNI number indicating from which SNI (which DS1 terminal 102 or DS3 terminal 104) the L2-PDU is input, by identifying a VPI/VCI attached to the header of the L2-PDU received from the highway connected to the switch 108 shown in FIG. 1.

An MID detector 1303 detects an MID attached to the header of the L2-PDU received from the highway connected to the switch 108 shown in FIG. 1.

In the meantime, the predetermined number of L3-PDUs the LP 113 processes in parallel for each of SNIs is stored at an address corresponding to each of the SNIs in the second memory 1305 as a "predetermined number of MCDUs". This number is predetermined by the control unit 109 shown in FIG. 1.

In addition, the number of L3-PDUs the LP 113 currently processes for each of the SNIs is stored at an address corresponding to each of the SNIs in the first memory 1304 as a "reception count".

The MID attached to the received L2-PDU having the BOM attribute with the reception count is stored at an address corresponding to a combination of each SNI and each reception count in a matcher 1306.

According to the mechanism of the preferred embodiment shown in FIG. 13, the number of L3-PDUs the LP 113 processes in parallel for each of the SNIs is restricted, and the consistency of MIDs is maintained.

Detailed explanation will now be made about how the device implemented in the preferred embodiment as shown in FIG. 13 behaves when it receives an L2-PDU having the SSM attribute, an L2-PDU having the BOM attribute, and an L2-PDU having the EOM attribute.

FIG. 14 is a table of operations performed in the preferred embodiment. In this embodiment, there are 7 corresponding cases numbering from 1 to 7, upon receipt of an L2-PDU having the SSM attribute. There are also 7 corresponding cases numbering from 8 to 14 upon receipt of an L2-PDU having the BOM attribute. There are 4 corresponding cases numbering from 15 to 18 upon receipt of an L2-PDU having the EOM attribute. Note that if an L2-PDU having the COM attribute is received, no specific control operation is performed. The transfer of that L2-PDU, however, is performed as a matter of course.

Case 1, Upon Receipt of an L2-PDU havina the SSM Attribute

Explanation about the operations upon receipt of an L2-PDU having the SSM attribute is provided below, by referring to the flowchart shown in FIG. 15.

First of all, provided below is the explanation about Case 1 shown in FIG. 14, where the MID included in the received L2-PDU is stored in a range of the matcher 1306 corresponding to the SNI number of the L2-PDU, and the predetermined number of MCDUs in the second memory 1305 corresponding to the SNI number of the L2-PDU is 1.

Such a case may arise when a subscriber terminal in a transmitting side in the SNI corresponding to the above described SNI number releases the MID after completing the transmission of the L2-PDU having the EOM attribute with the MID attached, and then transmits a new L2-PDU having the SSM attribute with that MID attached, and the L2-PDU having the EOM attribute with the combination of that SNI number and the MID attached, which is transmitted earlier, is discarded in a network.

Accordingly, the preceding communication corresponding to the above described MID must be forcibly aborted in the LP 113 in this case. Upon termination of the transfer of the L3-PDU performed by the newly received L2-PDU having the SSM attribute, the communication setting is readily released. Accordingly, the value "1" must be subtracted from the reception count stored in the first memory 1304. This processing is implemented according to the following flow.

Figure 15:
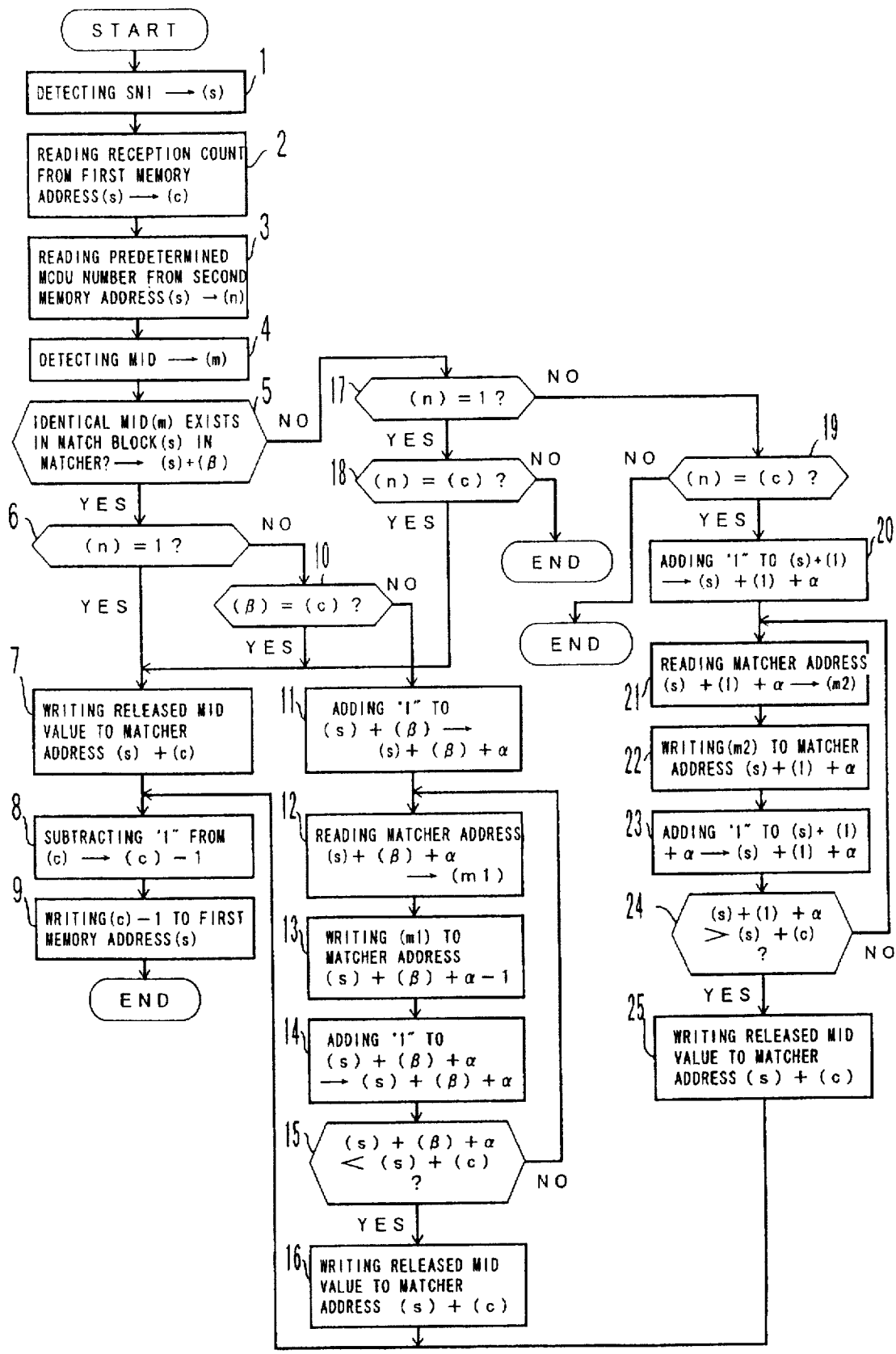
FIG. 15 shows a flowchart of operations upon receipt of an L2-PDU having the SSM attribute.

Firstly, the SNI detector 1302 extracts the SNI number by identifying the VPI/VCI of the received L2-PDU (ATM cell), and stores it in a register (s) not shown in the attached drawings (Step 1 of FIG. 15). Where (s) appears hereinafter in this document, it refers to the contents of this register.

Next, the reception count is read from the address corresponding to the above described register (s) in the first memory 1304, and stored in a register (c) not shown in the attached drawings (Step 2 of FIG. 15). Where (c) appears hereinafter, it refers to the contents of the content of this register. By extracting the segment type SSM included in the header of the received L2-PDU by the ST detector at that time, a chip select signal (CS signal) is provided to the first memory 1304.

11

Then, the predetermined number of MCDUs is read from the address corresponding to the register (s) in the second memory 1305, and stored in a register (n) not shown in the attached drawings (Step 3 of FIG. 15). Where (n) appears hereinafter, it refers to the contents of this register. Also at that time, by extracting the segment type SSM included in the header of the received L2-PDU by the ST detector 1301, the CS signal is provided to the second memory 1305.

After that, the MID detector 1303 extracts the MID included in the header of the received L2-PDU, and stores it in a register (m) not shown in the attached drawings (Step 4 of FIG. 15). Where (m) appears hereinafter, it refers to the contents of this register.

The SNI number (s) output from the SNI detector 1302 is provided to the matcher 1306 as a match block select signal, and at the same time the MID (m) output from the MID detector 1303 is provided to the matcher 1306 as match data. The matcher 1306 then determines whether or not the MID (m) included in the received L2-PDU is already stored in an address range (s) corresponding to the SNI number (s) of the received L2-PDU (Step 5 of FIG. 15). As shown in FIG. 14, the determination result is YES in Case 1 (marked with ○). As a result, the matcher 1306 outputs the match address (s)+(β).

Then, an MCDU "1" checker 1307 determines whether or not the predetermined number of MCDUs corresponding to the SNI number (s) of the received L2-PDU read from the second memory 1305 is 1, that is, whether or not the number of L3-PDUs the LP 113 processes in parallel for that SNI number is 1 (Step 6 of FIG. 15). As shown in FIG. 14, the determination result is YES in Case 1.

According to this determination result, a CS generator 1313 outputs a CS signal to the matcher 1306. At the same time, a write address selector 1314 outputs a write address corresponding to the combination of the SNI number (s) of the received L2-PDU output from the SNI detector 1302 and the reception count (c) corresponding to the SNI number of the received L2-PDU output from the first memory 1304, to the matcher 1306. Note that the reception count is always 1 in Case 1. Additionally, a write data selector 1315 outputs the released MID value stored in a released MID value register 1316 to the matcher 1306 as write data (Step 7 of FIG. 15). As described above, duplicate MIDs in the communication corresponding to the reception count (c)=1 are released, and the preceding communication is forcibly aborted.

The a reception count "1" subtractor 1311 subtracts "1" from the reception count (c) corresponding to the SNI number of the received L2-PDU output from the first memory 1304 (Step 8 of FIG. 15). Since the value of the register (c) is 1 in Case 1, the subtraction result is obtained as follows:

(c) −1=0.

A write data selector 1312 selects the value 0 output from the subtractor 1311 according to the match signal output from the matcher 1306 and the output from an MCDU "1" checker 1307, so that the value 0 is written to the address corresponding to the SNI number of the received L2-PDU as a new reception count in the first memory 1304 (Step 9 of FIG. 15). Since the predetermined number of MCDUs stored at the address corresponding to the received L2-PDU in the second memory 1305 is 1, the succeeding communication setting is released. Additionally, upon termination of the transfer of the L3-PDU performed by the L2-PDU having the SSM attribute, the succeeding communication setting is released. As a result, the reception count is reset to 0.

12

Case 2. Upon Receipt of an L2-PDU having the SSM Attribute

Provided below is the explanation about Case 2, upon receipt of an L2-PDU having the SSM attribute7 shown in FIG. 14. This case assumes that the MID included in the received L2-PDU is currently stored at the end address in the range of the matcher 1306 corresponding to the SNI number of the received L2-PDU, and the predetermined number of MCDUs corresponding to the SNI number of the L2-PDU in the second memory 1305 is equal to or greater than 1.

Such a case may arise in a similar situation as in Case 1.

Similar to Case 1, the preceding communication corresponding to the above described MID is forcibly aborted in the LP 113. Upon termination of the transfer of the L3-PDU performed by the newly-received L2-PDU having the SSM attribute, the communication setting is released. Accordingly, it is required to subtract "1" from the reception count stored in the first memory 1304. This process is implemented according to the following flow.

A process similar to the one performed in Steps 1 through 4 shown in FIG. 15 in Case 1 is performed, and the determination result in step 5 is YES in a similar manner as in Case 1.

The MCDU "1" checker 1307 then determines whether or not the predetermined number of MCDUs (n) corresponding to the SNI number (s) of the received L2-PDU read from the second memory 1305 is 1, that is, whether or not the number of the L3-PDUs that the LP 113 processes in parallel for that SNI number is 1 (Step 6 of FIG. 15). As shown in FIG. 14, the determination results in NO in Case 2 (marked with X).

A reception count/match address comparator 1309 determines whether or not the address (β) corresponding to the reception count of the match address (s)+(β) output from the matcher 1306 matches the current reception count corresponding to the SNI number of the received L2-PDU, that is, whether or not the address holding the same MID as the MID (m) stored in the received L2-PDU is the end address of the address range (s) corresponding to the SNI number (s) of the received L2-PDU in the matcher 1306 (Step 10 of FIG. 15). As shown in FIG. 14, the determination results in YES in Case 2.

Then, a process similar to the one performed in Steps 7 through 9 shown in FIG. 15 in Case 1 is performed. As a result, the released MID value is written to the end address (c) (=(β)) of the address range (s) corresponding to the SNI number (s) of the received L2-PDU in the matcher 1306, thereby releasing the duplicate MIDs. As a result, the preceding communication is forcibly aborted. In addition, the value "1" is subtracted from the reception count (c) stored at the address corresponding to the SNI number of the received L2-PDU in the first memory 1304.

Case 3. Upon Receipt of an L2-PDU having the SSM Attribute

Provided below is the explanation about Case 3, upon receipt of an L2-PDU having the SSM attribute shown in FIG. 14. This case assumes that the MID included in the received L2-PDU is currently stored at an address other than the end address of the range in the matcher 1306, and the predetermined number of MCDUs in the second memory 1305 corresponding to the SNI number of the L2-PDU is equal to or greater than 1.

Such a case may arise in a similar situation as in Case 1.

In this case, the preceding communication corresponding to the above described MID must be forcibly aborted in a similar manner as in Case 1. To release the MIDs of the intermediate addresses other than the end address of the range of the matcher 1306 corresponding to the SNI number of the L2-PDU, specific control is required. Upon termination of the transfer performed by the newly received L2-PDU having the SSM attribute, the communication setting is released. Accordingly, the value "1" must be subtracted from the reception count of the first memory 1304. This process is implemented according to the following flow.

A process similar to the one performed in Steps 1 through 6 shown in FIG. 15 in Case 2 is performed, and the determinations of Steps 5 and 6 result in YES and NO respectively.

Then, the reception count/match address comparator 1309 determines whether or not the address (β) corresponding to the reception count included in the match address (s)+(β) output from the matcher 1306 matches the current reception count (c) corresponding to the SNI number of the received L2-PDU output from the first memory 1304, according to the match signal output from the matcher 1306 and the output status of the MCDU "1" checker 1307 (Step 10 of FIG. 15). As shown in FIG. 14, since the address (β) holding the same MID as the one included in the received L2-PDU is an address other than the end address of the address range (s) corresponding to the SNI number (s) of the received L2-PDU in the matcher 1306, the determination results in NO.

Figure 18:
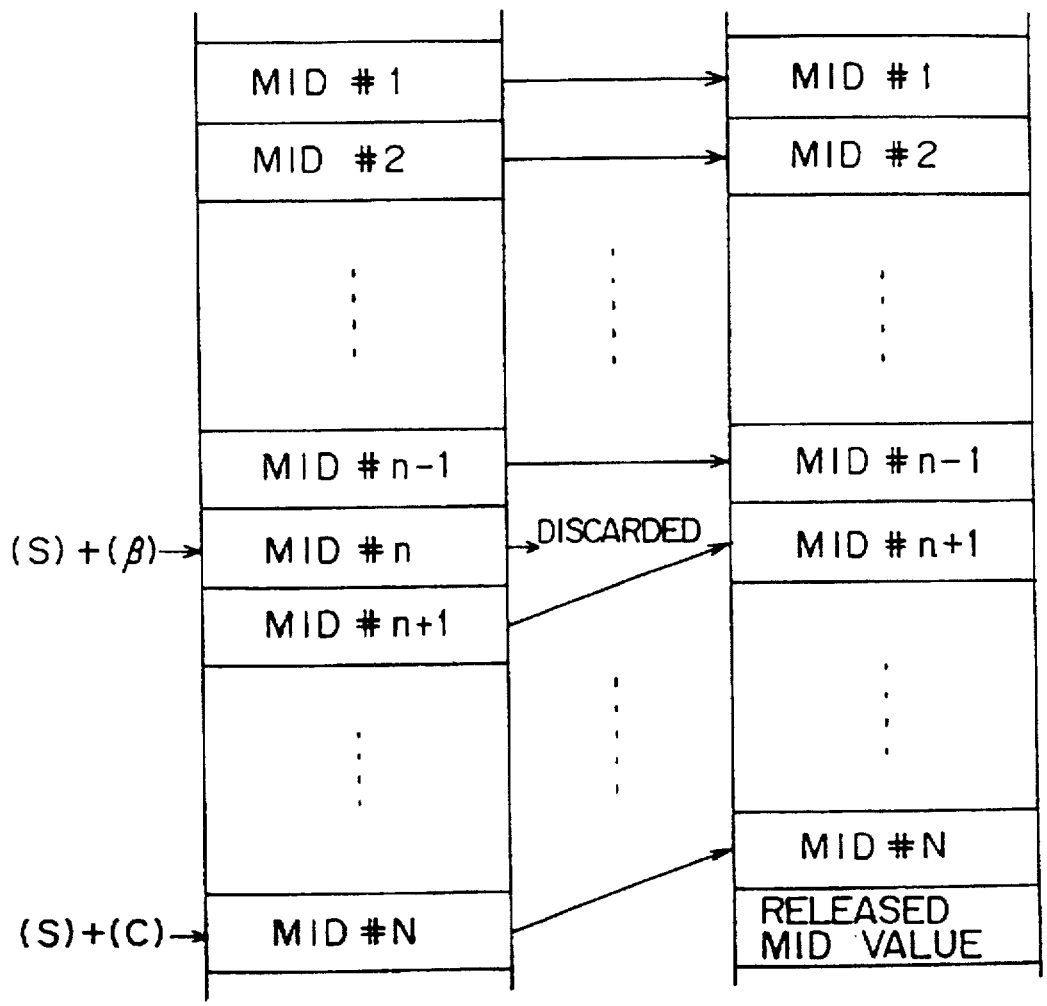
FIG. 18 is a schematic diagram showing the preferred embodiment of the present invention.

As a result, Steps 11 through 16 are performed, and the MID of the match address (s)+(β) is discarded as shown in Case 3 of FIG. 14 and in FIG. 18. At the same time, the MID of each address succeeding the match address (s)+(β) is moved up to the preceding address starting from the match address (s)+(β).

That is, the address selector 1319 selects the match address (s)+(β), and the "1" adder 1318 adds 1 to the match address (s)+(β) (Step 11 of FIG. 15). The resultant output from the "1" adder 1318 is represented as (s)+(β)+α.

After the matcher 1306 specifies the output from the "1" adder 1318 (s)+(β)+α as a read address, the MID is read from the address (s)+(β)+α of the matcher 1306, and stored in a register (m1) not shown in the attached drawings (Step 12 of FIG. 15). Where (m1) appears hereinafter, it refers to the contents of this register.

If the output from the address+1/reception count comparator 1317 is within an allowable range, the write address selector 1314 outputs the output (s)+(β)+α−1 from the address selector 1319 as a write address, and at the same time the write data selector 1315 outputs the MID (m1) of the address (s)+(β)+α output from the matcher 1306 to the matcher 1306 as write data. Then, the CS generator 1313 outputs the CS signal to the matcher 1306. As a result, the MID (m1) of the address of the matcher 1306 (s)+(β)+α is moved up to the preceding address (s)+(β)+α−1 (Step 13 of FIG. 15).

The "1" adder 1318 increments the value of the address (s)+(β)+α output from address+1/reception count comparator 1317 by 1 (Step 14 of FIG. 15), and the MID (m1) of the address (s)+(β)+α of the matcher 1306 is moved up to the preceding address (s)+(β)+α−1 until the address+1/reception count comparator 1317 determines that the address (s)+(β)+α exceeds the value (s)+(c) (until the result of Step 15 shown in FIG. 15 is determined to be YES (Steps 12 and 13 of FIG. 15).

The (c) is the current reception count of the SNI output from the first memory 1304 corresponding to the SNI number (s) of the received L2-PDU. The (s)+(c) is the end address of the range (s) corresponding to the SNI of the matcher 1306. If the address+1/reception count comparator 1317 determines that the value of the address (s)+(β)+α exceeds the value (s)+(c), and outputs NG (the determination result of Step 15 in FIG. 15 is YES), the write address selector 1314 outputs the address (s)+(β)+α−1=(s)+(c) output from the address selector 1319 as a write address, and at the same time the write data selector 1315 outputs the released MID value stored in the released MID value register 1316 to the matcher 1306 as write data. Then, the CS generator 1313 outputs the CS signal to the matcher 1306. As a result, the current end address (s)+(c) of the matcher is released (see FIG. 18) (Step 16 of FIG. 15).

Thus, each of the MIDs corresponding to each of the communications is stored in a sequential order of the communications beginning from the one started earliest in the range, corresponding to each of the SNI numbers in the matcher 1306.

After that, a process similar to the one performed in Steps 8 and 9 in Case 1 shown in FIG. 15 is performed. As a result, the value "1" is subtracted from the reception count (c) stored at the address corresponding to the SNI number of the received L2-PDU in the first memory 1304.

Case 4. Upon Receipt of an L2-PDU having the SSM Attribute

Provided below is the explanation about Case 4, upon receipt of an L2-PDU having the SSM attribute, shown in FIG. 14. This case assumes that the MID included in the received PDU is not stored in the range of the matcher 1306 corresponding to the SNI number of the L2-PDU, the predetermined number of MCDUs in the second memory 1305 corresponding to the SNI number of the L2-PDU is 1, and the reception count in the first memory 1304 corresponding to the SNI number of the L2-PDU is 1.

Such a case may arise when the subscriber terminal in the transmitting side of the SNI corresponding to the above described SNI number does not complete the transmission of the L2-PDU having the EOM attribute with the MID attached, and transmits the L2-PDU having the SSM attribute with a new MID attached.

Since the predetermined number of MCDUs is 1 in this case, the preceding communication corresponding to that MID must be forcibly aborted in the LP 113. Upon termination of the transfer of the L3-PDU performed by the newly received L2-PDU having the SSM attribute, the communication setting is released. Therefore, the value "1" must be subtracted from the reception count of the first memory 1304. This process is implemented according to the following flow.

First of all, a process similar to the one performed in Steps 1 through 4 shown in FIG. 15 in Case 1 is performed, and the determination results in NO, the inverse of that in Case 1.

The MCDU "1" checker 1307 then determines whether or not the predetermined number of MCDUs of the received L2-PDU read from the second memory 1305 is 1 (Step 17 of FIG. 15). As shown in FIG. 14, the determination result is YES in Case 4.

According to this determination result, the predetermined MCDU number/reception count comparator determines whether or not the reception count (c) corresponding to the SNI number (s) of the received L2-PDU read from the first memory 1304 matches the predetermined number of MCDUs (n) "1" corresponding to the SNI number (s) of the received L2-PDU read from the second memory 1305, that is, whether or not the value of the reception count (c) is 1 (Step 18 of FIG. 15). As shown in FIG. 14, the determination result is YES in Case 4.

Then, a process similar to the one performed in Steps 7 through 9 shown in FIG. 15 in Case 1 is performed. As a result, the released MID value is written to the address (c) "1" in the address range (s) corresponding to the SNI number (s) of the received L2-PDU in the matcher 1306, and the MID associated with the communication corresponding to the reception count (c) for that address is released. At the same time, the preceding communication is forcibly aborted. The value "1" is subtracted from the reception count (c) stored at the address corresponding to the SNI number of the received L2-PDU in the first memory 1304, and the reception count results in 0.

Case 5. Upon Receipt of an L2-PDU having the SSM Attribute

Provided below is the explanation about Case 5, upon receipt of an L2-PDU having the SSM attribute, shown in FIG. 14. This case assumes that the MID included in the received L2-PDU is not stored in the range of the matcher 1306 corresponding to the SNI number of the L2-PDU, the predetermined number of MCDUs in the second memory 1305 corresponding to the SNI number of the L2-PDU is 1, and the reception count in the first memory 1304 corresponding to the SNI number of the received L2-PDU is 0.

Such a case may arise when the subscriber terminal in the transmitting side of the SNI corresponding to the above described SNI number firstly transmits an L2-PDU having the SSM attribute.

In this case, no communication associated with that SNI was made. The newly received L2-PDU having the SSM attribute transfers the L3-PDU by itself, and the succeeding communication is released upon termination of that transfer. There is no need to change the status of the SNI. This process is implemented according to the following flow.

First of all, a process similar to the one performed in Steps 1 through 4 shown in FIG. 15 in Case 4 is performed, and the determinations of Steps 5 and 17 result in NO and YES respectively.

According to these determination results, the predetermined MCDU number/reception count comparator 1308 determines whether or not the reception count (c) corresponding to the SNI number (s) of the received L2-PDU read from the first memory 1304 matches the predetermined number of MCDUs (n) "1" corresponding to the SNI number (s) of the received L2-PDU read from the second memory 1305, that is, whether or not the reception count (c) is 1 (Step 18 of FIG. 15). As shown in FIG. 14, the determination result is NO in Case 5. Accordingly, the status upon receipt of the L2-PDU having the SSM attribute remains unchanged.

Case 6. Upon Receipt of an L2-PDU having the SSM Attribute

Provided below is the explanation about Case 6, upon receipt of an L2-PDU having the SSM attribute, shown in FIG. 14. This case assumes that the MID included in the received L2-PDU is not stored in the range of the matcher 1306 corresponding to the SNI number of the L2-PDU, the predetermined number of the MCDUs in the second memory 1305 corresponding to the SNI number of the L2-PDU is not 1, and the reception count in the first memory 1304 corresponding to the SNI number of the L2-PDU is equal to the predetermined number of the MCDUs.

Such a case may arise when a subscriber terminal in the transmitting side of the SNI corresponding to the SNI number communicates with the same number of the L3-PDUs as the predetermined number of MCDUs, and transmits the L2-PDU having the SSM attribute with a new MID attached before completing the transmission of the L2-PDU having the EOM attribute.

In this case, specific control is required to forcibly abort the communication started earliest. The newly received L2-PDU having the SSM attribute transfers the L3-PDU by itself, and the communication setting is released upon termination of that transfer. Accordingly, the value "1" must be subtracted from the reception count of the first memory 1304. This process is implemented according to the following flow.

Fist of all, a process similar to the one performed in Steps 1 through 4 shown in FIG. 15 in Case 1 is performed, but the determination result in Step 5 is NO, the inverse of that in Case 1.

The MCDU "1" checker 1307 determines whether or not the predetermined number of MCDUs (n) of the received L2-PDU read from the second memory 1305 is 1. As shown in FIG. 14, the determination result is NO in Case 6.

According to this determination result, the predetermined MCDU number/reception count comparator 1308 determines whether or not the reception count (c) corresponding to the SNI number (s) of the received L2-PDU read from the first memory 1304 matches the predetermined number of MCDUs (n) corresponding to the SNI number (s) of the received L2-PDU read from the second memory 1305 (Step 19 of FIG. 15). As shown in FIG. 14, the determination result is YES in Case 6.

As a result, in a similar manner as in Steps 11 through 16 in Case 3, the MID of the start address $(s)+(1)$ of the range (s) in the matcher 1306 corresponding to the SNI number of the received L2-PDU, is discarded in Steps 20 through 25 as shown in Case 6 of FIG. 14, and each MID of each of the addresses succeeding the match address $(s)+(1)$ is moved up to the preceding address starting from the match address $(s)+(1)$. The only difference from the operation described in Case 3 by referring to FIG. 18 is to use the start address $(s)+(1)$ instead of the match address $(s)+(\beta)$ as the start address for moving up the MIDs, and it is almost the same operation as the one explained in Case 3.

That is, the address selector 1319 firstly selects the match address $(s)+(1)$, and the "1" adder 1318 adds the value 1 to the match address $(s)+(1)$ (Step 20 of FIG. 15). The output from the "1" adder 1318 is represented as the value $(s)+(1)+\alpha$.

After the matcher 1306 specifies the value $(s)+(1)+\alpha$ output from the "1" adder 1318 as a read address, the MID stored at $(s)+(1)+\alpha$ is read from the matcher 1306, and stored in a register (m2) not shown in the attached drawings (Step 21 of FIG. 15). Where (m2) appears hereinafter, it refers to the contents of this register.

If the result output from the address+1/reception count comparator 1317 is within the allowable range, the write address selector 1314 outputs the address $(s)+(1)+\alpha-1$ output from the address selector 1319 as a write address, and the write data selector 1315 outputs the MID (m2) stored at the address $(s)+(1)+\alpha$ output from the matcher 1306 as write data. Then, the CS generator 1313 outputs the CS signal to the matcher 1306. As a result, the MID (m2) stored at the address $(s)+(1)+\alpha$ is moved up to the preceding address $(s)+(1)+\alpha-1$ (Step 22 of FIG. 1).

The "1" adder 1318 increments the value of the address (s)+(1)+α output from the address+1/reception count comparator 1317 by 1 (Step 23 of FIG. 15), and the MID (m2) stored at the address (s)+(1)+α is moved up to the preceding address (s)+(1)+α−1 until the address+1/reception count comparator 1317 determines that the address (s)+(1)+α exceeds the value (s)+(c) (until the result of Step 24 shown in FIG. 15 is determined to be YES) (Steps 21 and 22 in FIG. 15).

(c) is the current reception count of the SNI output from the first memory 1304 corresponding to the SNI number (s) of the received L2-PDU, and the (s)+(c) is the end address of the range (s) corresponding to the SNI of the matcher 1306. If the address+1/reception count comparator 1317 determines that the value of the address (s)+(1)+α exceeds the value (s)+(c), and outputs NG (the determination result of Step 24 in FIG. 15 is YES), the write address selector 1314 outputs the value (s)+(1)+α−1=(s) output from the address selector 1319 to the matcher 1306 as a write address. Then, the write data selector 1315 outputs the released MID value stored in the released MID value register 1316 to the matcher 1306 as write data. Furthermore, the CS generator 1313 outputs the CS signal to the matcher 1306. As a result, the current end address (s)+(c) of the matcher 1306 is released (See the operation of Case 3 shown in FIG. 14) (Step 25 of FIG. 15)

Then, a process similar to the one performed in Steps 8 and 9 shown in FIG. 15 in Case 1 is performed. As a result, the value "1" is subtracted from the reception count (c) stored at the address corresponding to the SNI number of the received L2-PDU in the first memory 1304.

Case 7. Upon Receipt of an L2-PDU having the SSM Attribute

Provided below is the explanation about Case 7, upon receipt of an L2-PDU having the SSM attribute, shown in FIG. 14. This case assumes that the MID included in the received L2-PDU is not stored in the range of the matcher 1306 corresponding to the SNI number of the L2-PDU, the predetermined number of MCDUs in the second memory 1305 corresponding to the SNI number of the L2-PDU is not 1, and the reception count of the first memory 1304 corresponding to the SNI number of the L2-PDU is less than the predetermined number of MCDUs.

In such a case, the subscriber terminal in the transmitting side of the SNI corresponding to the SNI number can transmit a new L2-PDU having the SSM attribute. The newly received L2-PDU having the SSM attribute transmits the L3-PDU by itself, and the communication setting is released upon termination of that transfer. Accordingly, there is no need to change the status of the SNI. This process is implemented according to the following flow.

First of all, a process similar to the one performed in Steps 1 through 4 shown in FIG. 15 in Case 1 is performed. The inverse of that in Case 1, the result of Step 5 is determined to be NO, while the result of Step 17 in FIG. 15 is determined to be NO in a similar manner as in Case 6.

According to these determination results, the predetermined MCDU number/reception count comparator 1308 determines whether or not the reception count corresponding to the SNI number (s) of the received L2-PDU read from the first memory 1304 matches the predetermined number of MCDUs (n) corresponding to the SNI number (s) of the received L2-PDU read from the second memory 1305 (whether or not the reception count reaches the predetermined number of MCDUs) (Step 19 of FIG. 15). As shown in FIG. 14, the determination result is NO in Case 7.

Case 8. Upon Receipt of an L2-PDU having the BOM Attribute

The explanation about the operations upon receipt of an L2-PDU having the BOM attribute is provided hereinafter, by referring to the flowchart shown in FIG. 16.

First of all, provided below is the explanation about Case 8, upon receipt of an L2-PDU having the SSM attribute, shown in FIG. 14. This case assumes that the MID included in the received L2-PDU is currently stored in the range of the matcher 1306 corresponding to the SNI number of the L2-PDU, and the predetermined number of MCDUs in the second memory 1305 corresponding to the SNI number of the received L2-PDU is 1, in the similar manner as in Case 1, upon receipt of an L2-PDU having the SSM attribute shown in FIG. 14.

Such a case may arise when the subscriber terminal in the transmitting side of the SNI corresponding to the SNI number completes the transmission of the L2-PDU having the EOM attribute with the above described MID attached, in order to release the MID, and then transmits a new L2-PDU having the BOM attribute with that MID attached, and the L2-PDU having the EOM attribute with the combination of the SNI number and the MID attached, which was transmitted earlier, is discarded from a network.

Accordingly, the preceding communication corresponding to the SNI and MID is forcibly aborted in the LP 113 in this case, and the newly received L2-PDU having the BOM attribute is dedicated to a new communication state. Since the reception count of the first memory 1304 remains unchanged in the LP 113, and the predetermined number of MCDUs corresponding to the SNI is 1, the matching MID stored at the beginning of the range corresponding to the SNI number in the matcher 1306 is kept for a newly received L2-PDU having the BOM attribute. There is no need to change the status of the SNI. This process is implemented according to the following flow.

Figure 16:
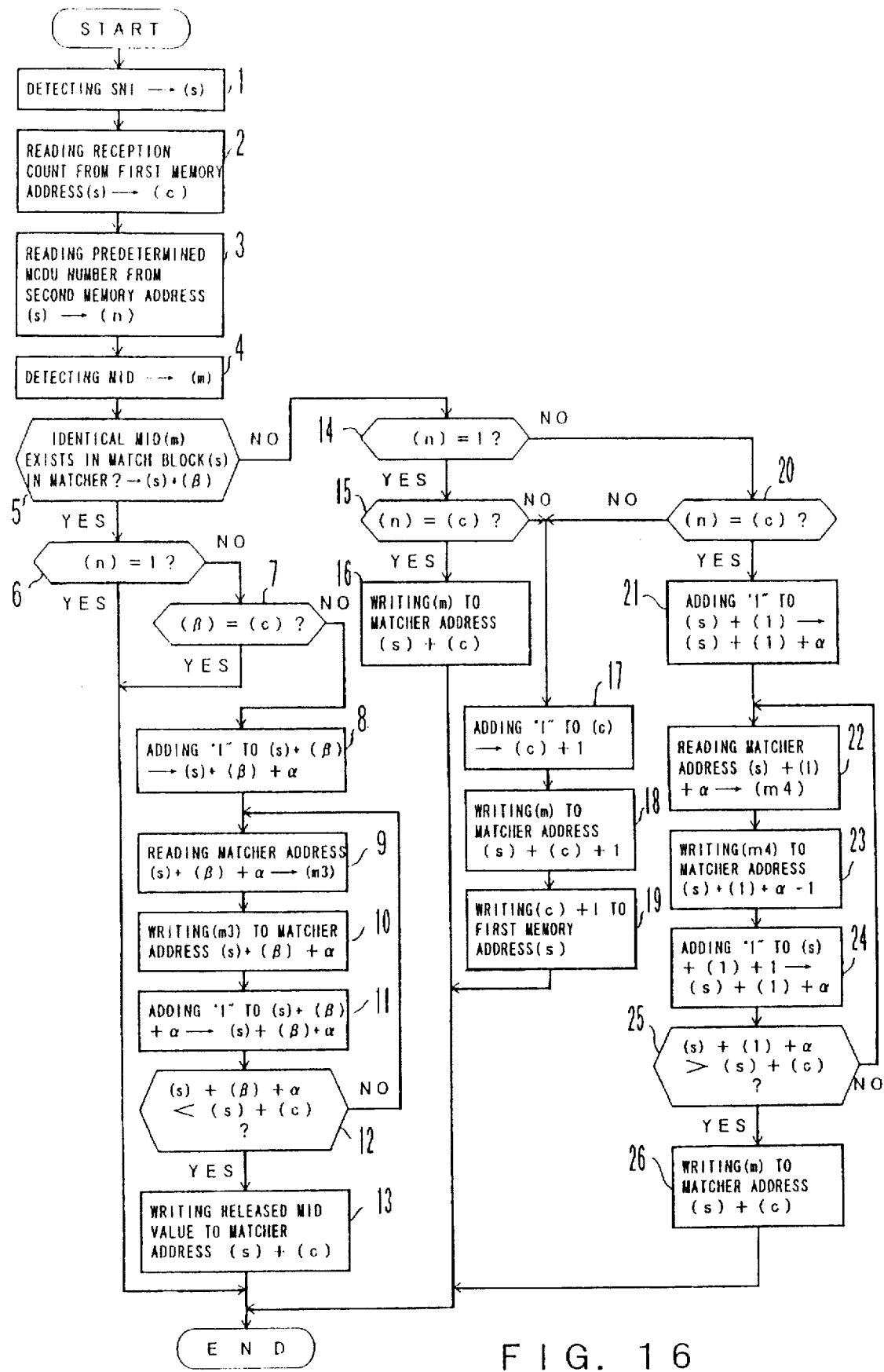
FIG. 16 shows a flowchart of operations upon receipt of an L2-PDU having the BOM attribute.

That is, Steps 1 through 4 shown in FIG. 16, similar to Steps 1 through 4 of FIG. 15 in Case 1, are performed, and the determinations of Steps 5 and 6 result in YES, in a similar manner as in Steps 5 and 6 of FIG. 15 in Case 1.

As a result, the state upon receipt of the L2-PDU having the BOM is left unchanged.

Case 9. Upon Receipt of an L2-PDU having the BOM Attribute

Provided below is the explanation about Case 9, upon receipt of an L2-PDU having the BOM attribute, shown in FIG. 14. This case assumes that the MID included in the received L2-PDU is currently stored at the end address of the range in the matcher 1306 corresponding to the SNI number of the L2-PDU, and the predetermined number of MCDUs in the second memory 1305 corresponding to the SNI number of the L2-PDU is equal to or greater than 1, in a similar manner as in Case 2, upon receipt of an L2-PDU having the SSM attribute shown in FIG. 14.

Such a case may arise in a similar situation as in Case 8.

In this case, in a similar manner as in Case 8, the preceding communication corresponding to the above described SNI and MID is forcibly aborted in the LP 113, and the newly received L2-PDU having the BOM attribute is dedicated to a new communication state. In the LP 113, however, the reception count in the first memory 1304 remains unchanged, and the matching MID stored at the end address of the range corresponding to the SNI number in the matcher 1306 is kept as the latest MID for a newly-received L2-PDU having the BOM attribute. There is no need to change the status of the SNI. This process is implemented according to the following flow.

After Steps 1 through 4 of FIG. 16 are performed, similar to Steps 1 through 4 in Case 1 shown in FIG. 15 in Case 1, the determinations of Steps 5, 6, and 7 shown in FIG. 16 result in YES, NO, and YES respectively, in a similar manner as in Steps 5, 6, and 10 in Case 1 shown in FIG. 15.

As a result, the state upon receipt of the L2-PDU having the BOM remains unchanged.

Case 10. Upon Receipt of an L2-PDU having the BOM Attribute

Provided below is the explanation about Case 10, upon receipt of an L2-PDU having the BOM attribute, shown in FIG. 14. This case assumes that the MID included in the received L2-PDU is currently stored at an address other than the end address of the range in the matcher 1306 corresponding to the SNI number of the L2-PDU, "and the predetermined number of MCDU's in the second memory 1305 corresponding to the SNI number of the L2-PDU" is equal to or greater than 1, in the similar manner as in Case 3, upon receipt of an L2-PDU having the SSM attribute shown in FIG. 14.

Such a case may arise in a similar situation as in Case 8.

In this case, the preceding communication corresponding to the above described MID must be forcibly aborted in the LP 113. As in Case 3, the MIDs of the intermediate addresses other than the end address of the range in the matcher 1306 corresponding to the SNI number of the L2-PDU are released, and each of the MID values stored at each of the succeeding addresses in the range must be moved up to the preceding address. Since the newly received L2-PDU having the BOM attribute is dedicated to a new communication state, the MID corresponding to the L2-PDU having the BOM attribute must be stored at the end address of the range in the matcher 1306. There is no need to change the reception count in the first memory 1304. This process is implemented according to the following flow.

First of all, the process performed in Steps 1 through 7 shown in FIG. 16, similar to the process performed in Steps 1 through 6, And 10 shown in FIG. 15 in Case 3, is performed, and the determinations of Steps 5, 6 and 7 are YES, NO, and NO respectively.

Then, the process performed in Steps 8 through 12 shown in FIG. 16, similar to the processing performed in Steps 11 through 15 in Case 3 shown in FIG. 15, is performed. As in Case 10 shown in FIG. 14 and in FIG. 18, the MID of the match address (s)+(β) is discarded, and each MID of each address succeeding the match address (s)+(β) in the range (s) is sequentially moved up to the preceding address starting from the match address (s)+(β), in the matcher 1306. The register (m3) shown in FIG. 16 corresponds to the register (m1) shown in FIG. 15.

While iterating the process performed in Steps 9 through 12 shown in FIG. 16, if the address+1/reception count comparator 1317 determines that the address (s)+(β)+α output from the "1" adder 1318 exceeds the value of the end address of the range (s) in the matcher 1306, and outputs NG (the determination result of Step 12 in FIG. 16 is YES), the write address selector 1314 outputs the value (s)+(β)+α−1= (s)+(c) output from the address selector 1319 to the matcher 1306 as a write address. At the same time, the write data selector 1315 outputs the MID (m) stored in the received L2-PDU output from the MID detector 1303 to the matcher 1306 as write data, and the CS generator 1313 outputs the CS signal to the matcher 1306. As a result, the MID (m) corresponding to a newly received L2-PDU having the BOM attribute is stored at the current end address (s)+(c) in the matcher 1306 (Step 13 of FIG. 16). As described above, there is no need to change the reception count of the SNI number corresponding to the received L2-PDU in the first memory 1304.

Case 11. Upon Receipt of an L2-PDU having the BOM Attribute

Provided below is the explanation about Case 11, upon receipt of an L2-PDU having the BOM attribute, shown in FIG. 14. This case assumes that the MID included in the received L2-PDU is not stored in the range of the matcher 1306 corresponding to the SNI number of the L2-PDU, the predetermined number of MCDUs in the second memory 1305 corresponding to the SNI number of the L2-PDU is 1, and the reception count in the first memory 1304 corresponding to the SNI number of the L2-PDU is 1, in a similar manner as in Case 4, upon receipt of an L2-PDU having the SSM attribute shown in FIG. 14.

Such a case may arise when the subscriber terminal in the transmitting side of the SNI corresponding to the SNI number does not complete the transmission of the L2-PDU having the EOM attribute with the above described MID attached, and transmits a new L2-PDU having the BOM attribute with a new MID attached.

Since the predetermined number of MCDUs is 1 in this case, the preceding communication corresponding to the above described SNI and MID is forcibly aborted in the LP 113, and the newly received L2-PDU having the BOM attribute is dedicated to a new communication state. There is no need to change the reception count "1" in the first memory 1304 in the LP 113. The current MID stored at the beginning of the range corresponding to the SNI number in the matcher 1306 is updated to the latest MID value for the newly received L2-PDU having the BOM attribute. This process is performed according to the following flow.

First of all, the process performed in Steps 1 through 5, 14, and 15 shown in FIG. 16, similar to the process performed in Steps 1 through 5 shown in FIG. 15 in Case 4, is performed, and the determinations at Steps 5, 14, and 15 shown in FIG. 16 result in NO, YES, and YES respectively.

According to these determination results, the write address selector 1314 shown in FIG. 13 outputs the address (s)+(c) based on the address (s) output from the SNI detector 1302 and the address (c) output from the first memory 1304 to the matcher 1306 as a write address. The write data selector 1315 then outputs the MID (m) included in the received L2-PDU output from the MID detector 1303 to the matcher 1306 as a write data, and the CS generator 1313 outputs the CS signal to the matcher 1306. As a result, the MID at the beginning of the range (s) ((c)=1) corresponding to the SNI number of the received L2-PDU in the matcher 1306 is updated to the MID (m) corresponding to the newly received L2-PDU having the BOM attribute (Step 16 of FIG. 16).

Case 12. Upon Receipt of an L2-PDU having the BOM Attribute

Provided below is the explanation about Case 12, upon receipt of an L2-PDU having the BOM attribute, shown in FIG. 14. This case assumes that the MID included in the received L2-PDU is not stored in the range of the matcher 1306 corresponding to the SNI number of the L2-PDU, the predetermined number of MCDUs in the second memory 1305 corresponding to the SNI number of the L2-PDU is 1, and the reception count in the first memory 1304 corresponding to the SNI number of the L2-PDU is 0, in a similar manner as in Case 5, upon receipt of an L2-PDU having the SSM attribute shown in FIG. 14.

Such a case may arise when the subscriber terminal in the transmitting side of the SNI corresponding to the SNI number first transmits an L2-PDU having the BOM attribute.

The transmitted L2-PDU having the BOM attribute is dedicated to one normal state. That is, in the LP 113, the reception count of the address corresponding to the SNI number in the first memory 1304 is set to 1, and the MID at the beginning of the range corresponding to the SNI number in the matcher 1306 is updated to the MID for the received L2-PDU having the BOM attribute. This process is implemented according to the following flow.

First of all, Steps 1 through 5, 14, and 15 of FIG. 16, similar to Steps 1 through 5, 17, and 18 of FIG. 15, are executed, and the determinations of Steps 5, 14, and 15 of FIG. 16 result in NO, YES, and NO respectively.

According to these determination results, the reception count "1" adder 1310 adds the value 1 to the reception count (c)=0 output from the first memory 1304. As a result, the reception count "1" adder 1310, outputs the value (c)+1=1.

Then, the write address selector 1314 outputs the address (s)+(c)+1=(s)+1 obtained by the value (s) output from the SNI detector 1302 and the value (c)+1 output from the reception count "1" adder 1310, to the matcher 1306 as a write address. At the same time, the write data selector 1315 outputs the MID (m) stored in the received L2-PDU output from the MID detector 1303 to the matcher 1306 as write data, and the CS generator outputs the CS signal to the matcher 1306. As a result, the MID (m) corresponding to the received L2-PDU having the BOM attribute is written to the beginning ((c)=1) of the range (s) corresponding to the SNI number of the received L2-PDU in the matcher 1306 (Step 18 of FIG. 16)

Furthermore, the write data selector outputs the value (c)+1=1 output from the reception count "1" adder 1310 to the first memory 1304 as write data. As a result, the reception count "1" is written to the address corresponding to the SNI number of the received L2-PDU output from the SNI detector 1302.

Case 13. Upon Receipt of an L2-PDU having the BOM Attribute

Provided below is the explanation about Case 13, upon receipt of an L2-PDU having the BOM attribute, shown in FIG. 14. This case assumes that the MID included in the received L2-PDU is not stored in the range of the matcher 1306 corresponding to the SNI number of the L2-PDU, the predetermined number of MCDUs in the second memory 1305 corresponding to the SNI number of the L2-PDU is not 1, and the reception count in the first memory 1304 corresponding to the SNI number of the L2-PDU is equal to the predetermined number of MCDUs, in a similar manner as in Case 6, upon receipt of an L2-PDU having the SSM attribute, shown in FIG. 14.

Such a case may arise when the subscriber terminal in the transmitting side of the SNI corresponding to the SNI number transmits a new L2-PDU having the BOM attribute with a new MID attached, before completing the transmission of the L2-PDU having the EOM attribute for all of the communications whose number is the same as the predetermined number of MCDUs, while performing the communications corresponding to the predetermined number of MCDUs.

In this case, the communication started earliest must be forcibly aborted in the LP 113. That is, in a similar manner as in Case 6, it is required to release the MID stored at the beginning of the range in the matcher 1306 corresponding to the SNI number of the L2-PDU, and to move each of the MID values stored at the addresses succeeding the second address up to the preceding address in the above described range. Since the newly received L2-PDU having the BOM attribute is dedicated to a new communication state, the MID corresponding to that L2-PDU having the BOM attribute must be stored at the end address of the range in the matcher 1306. There is no need to change the reception count in the first memory 1304. This process is implemented according to the following flow.

First of all, steps 1 through 5, 14, and 20 of FIG. 16, similar to Steps 1 through 5, 17, and 19 of FIG. 15 in Case 6, are executed, and the determinations of Steps 5, 14, and 20 result in NO, NO, and YES respectively.

By executing Steps 21 through 25 shown in FIG. 16, similar to Steps 20 through 24 in Case 6 shown in FIG. 15, in the matcher as shown in Case 3 of FIG. 14, the MID stored at the start address (s)+(1) of the range (s) is discarded, and each MID of each of the addresses succeeding the match address (s)+(1) in the range (s) is sequentially moved up to each of the addresses starting from the match address (s)+(1). The register (m4) shown in FIG. 16 corresponds to the register (m2) shown in FIG. 15.

If the address +1/reception count comparator 1317 shown in FIG. 13 determines that the address (s)+(1)+α exceeds the end address (s)+(c) of the range (s) in the matcher 1306, and outputs NG (the determination result of Step 25 shown in FIG. 16 is YES), the write address selector 1314 outputs the value (s)+(1)+α−1=(s)+(c) output from the address selector 1319 to the matcher 1306 as a write address, and at the same time the write data selector 1315 outputs the MID (m) included in the received L2-PDU output from the MID detector 1303 as write data. In addition, the CS generator 1313 outputs the CS signal to the matcher 1306. As a result, the MID (m) corresponding to the received L2-PDU having the BOM attribute is stored at the end address (s)+(c) of the matcher 1306 (Step 26 of FIG. 16).

As described above, there is no need to change the reception count of the SNI number corresponding to the received L2-PDU in the first memory 1304.

Case 14, Upon Receipt of an L2-PDU having the BOM Attribute

Provided below is the explanation about Case 14, upon receipt of an L2-PDU having the BOM attribute, shown in FIG. 14. This case assumes that the MID included in the received L2-PDU is not stored in the range of the matcher 1306 corresponding to the SNI number of the L2-PDU, the predetermined number of MCDUs in the second memory 1305 corresponding to the SNI number of the L2-PDU is not 1, and the reception count in the first memory 1304 corresponding to the SNI number of the L2-PDU does not reach the predetermined number of MCDUs in the first memory 1304, in a similar manner as in Case 7, upon receipt of an L2-PDU having the SSM attribute shown in FIG. 14.

In such a case, the subscriber terminal in the transmitting side of the SNI corresponding to the above described SNI number can transmit an L2-PDU having a new BOM attribute.

In this case, the value 1 is added to the reception count of the address corresponding to the SNI number in the first memory 1304. The MID setting for the received L2-PDU having the BOM attribute is written to the end address of the range corresponding to the SNI number of the matcher 1306. This process is implemented according to the following flow.

First of all, Steps 1 through 5, 14, and 20 of FIG. 16, similar to Steps 1 through 5, 17, and 19 of FIG. 15 in Case 7, are executed, and all of the determinations of Steps 5, 14, and 20 of FIG. 16 result in NO.

Then, the process in Steps 17 through 19 of FIG. 16, similar to the process in Case 12, is performed.

According to these determination results, the reception count "1" adder 1310 shown in FIG. 13 adds the value "1" to the reception count (c) output from the first memory 1304 (Step 17 of FIG. 16).

Then, the write address selector 1314 outputs the value (s)+(c)+1 obtained by the value (s) output from the SNI detector and the value (s)+(c)+1 output from the adder 1310 to the matcher 1306 as a write address, and at the same time the write data selector 1315 outputs the MID (m) included in the received L2-PDU output from the MID detector 1303 to the matcher 1306 as write data, and the CS generator 1313 outputs the CS signal to the matcher 1306. As a result, the MID (m) corresponding to the received L2-PDU having the BOM attribute is written to an address after the end address ((c)+1) of the range corresponding to the SNI number of the received L2-PDU of the matcher 1306 (Step 18 of FIG. 16).

The write data selector then outputs the value (c)+1 output from the reception count "1" adder 1310 to the first memory 1304 as the write data. As a result, the updated reception count is written to an address corresponding to the SNI number of the received L2-PDU output from the SNI detector 1302.

Case 15. Upon Receipt of an L2-PDU having the EOM Attribute

Provided below is the explanation about the operations when receiving an L2-PDU having the EOM attribute, referring to the flowchart shown in FIG. 17.

First of all, provided below is the explanation about Case 15, shown in FIG. 14. This case assumes that the MID included in the received L2-PDU is currently stored in the range of the matcher 1306 corresponding to the SNI number of the L2-PDU, and the predetermined number of MCDUs in the second memory 1305 corresponding to the SNI number of the L2-PDU is 1, in a similar manner as in Case 1 upon receipt of an L2-PDU having the SSM attribute shown in FIG. 14.

Such a case may arise when the subscriber terminal in the transmitting side of the SNI corresponding to the SNI number completes the transmission of the L2-PDU having the EOM attribute with the above described MID attached.

In this case, it is required to complete the communication setting corresponding to the above described MID in the LP 113, and to subtract the value "1" from the reception count in the first memory 1304. This process is implemented according to the following flow.

Figure 17:
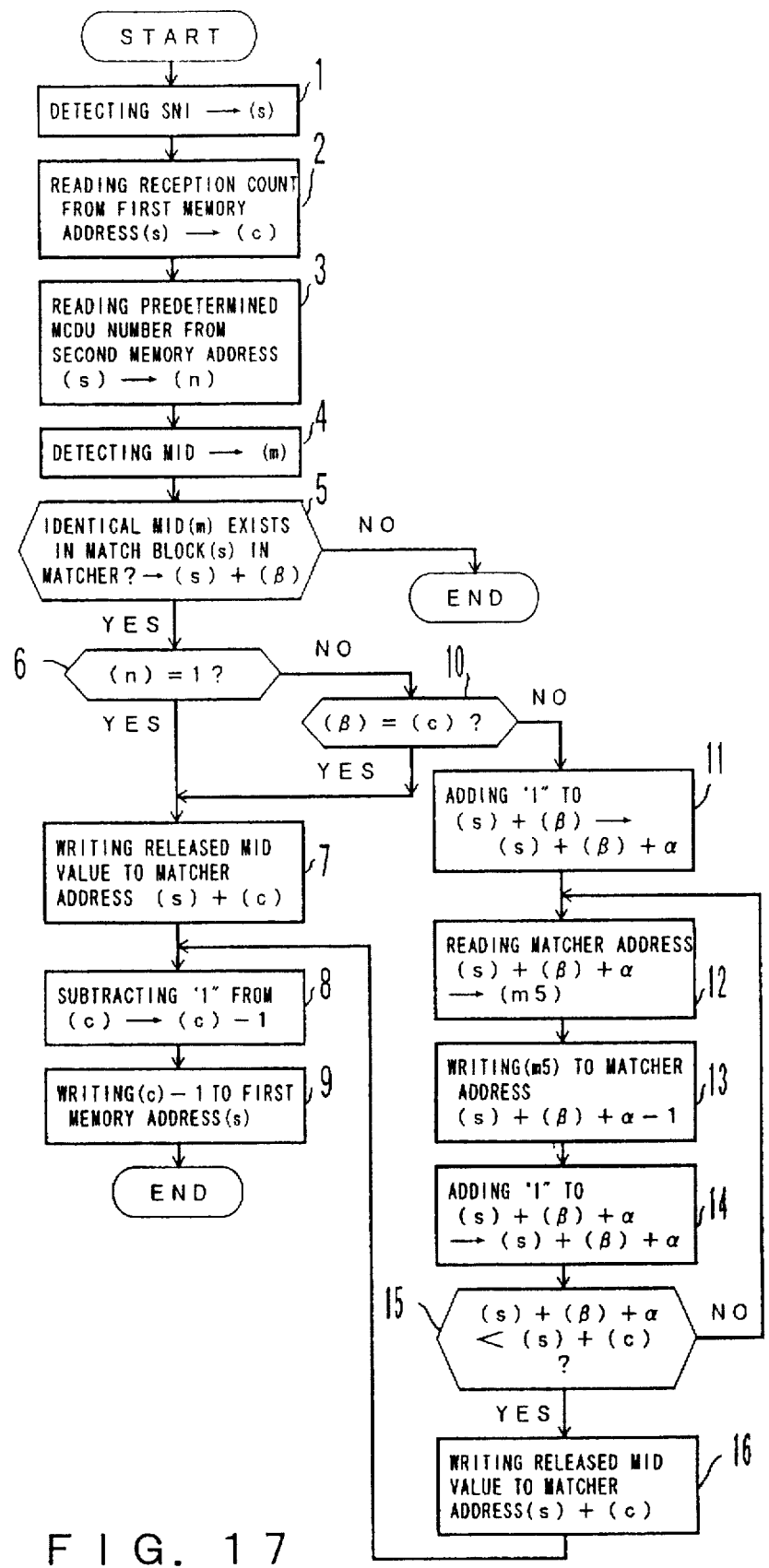
FIG. 17 shows a flowchart of operations upon receipt of an L2-PDU having the EOM attribute.

The process in Steps 1 through 4 shown in FIG. 17, similar to the one in Steps 1 through 4 in Case 15 shown in FIG. 15, is performed, and both of the determinations of Steps 5 and 6 result in YES in a similar manner as in Steps 5 and 6 in Case 1 shown in FIG. 15.

Subsequently, the process in Steps 7 through 9 shown in FIG. 17, similar to the one in Steps 7 through 9 in Case 1 shown in FIG. 15, is performed. As a result, the released MID value is written to the end address (c) (=(β)) of the address range (s) corresponding to the SNI number (s) of the received L2-PDU in the matcher 1306, and the duplicate MID associated with the communication for the reception count (c)=1 corresponding to that address is released, thereby normally terminating the communication. Furthermore, the value "1" is subtracted from the reception count (c) stored at the address corresponding to the SNI number of the received L2-PDU in the first memory 1304, and the reception count results in 0.

Case 16. Upon Receipt of an L2-PDU having the EOM Attribute

Provided below is the explanation about Case 16, upon receipt of an L2-PDU having the EOM attribute, shown in FIG. 14. This case assumes that the MID included in the received L2-PDU is currently stored at the end address of the range in the matcher 1306 corresponding to the SNI number of the L2-PDU, and the predetermined number of MCDUs corresponding to the SNI number of the L2-PDU in the second memory 1305 is equal to or greater than 1, in a similar manner as in Case 2, upon receipt of the L2-PDU having the SSM attribute, shown in FIG. 14.

Such a case may arise in a similar situation as in Case 15.

In this case, it is required to complete the communication corresponding to the above described MID, and to subtract the value "1" from the reception count of the first memory 1304. This process is implemented according to the following flow.

The process in Steps 1 through 4 shown in FIG. 17, similar to the one in Steps 1 through 4 in Case 15 shown in FIG. 15, is performed, and the determinations of Steps 5, 6, and 10 result in YES, NO, and YES respectively, in a similar manner as in Steps 5, 6, and 10 in Case 1 shown in FIG. 15.

Subsequently, the process similar to the one in Steps 7 through 9 in Case 15 shown in FIG. 17 is performed. As a result, by writing the released MID value to the end address (c) (=(β)) of the address range (s) corresponding to the SNI number (s) of the received L2-PDU in the matcher 1306, the duplicate MID associated with the communication for the reception count (c)=1 corresponding to that address is released, thereby normally terminating the communication. Furthermore, the value "1" is subtracted from the reception count (c) stored at the address corresponding to the SNI number of the received L2-PDU in the first memory 1304.

Case 17. Upon Receipt of an L2-PDU having the EOM Attribute

Provided below is the explanation about Case 17, upon receipt of an L2-PDU having the EOM attribute, shown in FIG. 14. This case assumes that the MID included in the received L2-PDU is currently stored at an address other than the end address of the range in the matcher 1306 corresponding to the SNI number of the L2-PDU, and the predetermined number of MCDUs in the second memory 1305 corresponding to the SNI number of the L2-PDU is equal to or greater than 1, in a similar manner as in Case 3, upon receipt of an L2-PDU having the SSM attribute, shown in FIG. 14.

Such a case may arise in a similar situation as in Case 15.

In this case, it is required to properly terminate the preceding communication corresponding to the above described MID in the LP 113. That is, in a similar manner as in Case 3, it is required to release the MIDs of the addresses other than the end address of the range in the matcher 1306 corresponding to the SNI number of the L2-PDU, and move each of the MIDs stored at each of the succeeding addresses up to the preceding address. After that, the value "1" should be subtracted from the reception count in the first memory 1304. This process is implemented according to the following flow.

The process in Steps 1 through 6, and 10 shown in FIG. 17, similar to the one in Steps 1 through 6, and 10 in Case 3 shown in FIG. 15, is performed, and the determinations of Steps 5, 6, and 10 shown in FIG. 17 result in YES, NO, and NO respectively.

Then, the process in Steps 11 through 16 shown in FIG. 17, similar to the one in Steps 11 through 16 in Case 3 shown in FIG. 15, is performed. As shown in Case 17 of FIG. 14 and in FIG. 18, in the matcher 1306, the MID of the match address (s)+(β) is discarded, and each of the MIDs stored at each of the addresses succeeding the match address (s)+(β) is moved up to the preceding address starting from the match address (s)+(β). Then, the current end address (s)+(c) in the matcher 1306 is released. Note that the register (m5) shown in FIG. 17 corresponds to the register (m1) shown in FIG. 15.

After that, the process similar to the one in Steps 8 and 9 shown in FIG. 17 in Case 15 or 16 is performed. As a result, the value "1" is subtracted from the reception count (c) stored at the address corresponding to the SNI number of the received L2-PDU in the first memory 1304.

Case 18. Upon Receipt of an L2-PDU having the EOM Attribute

Lastly provided below is the explanation about Case 18, upon receipt of an L2-PDU having the EOM attribute, shown in FIG. 14. This case assumes that the MID included in the received L2-PDU is not stored in the range of the matcher 1306 corresponding to the SNI number of the L2-PDU.

This case may arise when the subscriber terminal in the transmitting side in the SNI corresponding to the SNI number of the L2-PDU transmits the L2-PDU having the COM attribute with the above described MID attached after transmitting the L2-PDU having the BOM attribute with that MID attached, and then completes the transmission of the L2-PDU having the EOM attribute with the same MID attached. In this case, the L2-PDU having the BOM attribute is discarded in a network, the communication associated with the L2-PDU having the BOM attribute is not properly set up in the LP 113, and the transfer of that L2-PDU is not properly performed.

Since no setting is originally made for the above described communication in this case, there is no need to change its status.

After the process in Steps 1 through 4 shown in FIG. 17 is performed, the determination of Step 5 results in NO. As a result, the state upon receipt of the L2-PDU having the EOM remains unchanged.

The preferred embodiment described above assumes the SMDS system. However, a technique similar to the above described technique can also be applied to other systems, such as the one where one message is transmitted using one or a plurality of data units, each of which has an identifier attached.

What is claimed is:

1. A simultaneously-occurring message control unit in a communications system where one message of a subscriber is transmitted using one or a plurality of data units, each of which is attached with subscriber identification information for identifying the subscriber, message identification information for identifying the message corresponding to the one or the plurality of data units, and transfer order identification information for identifying an order of transferring the one or the plurality of data units in the message corresponding to the one or the plurality of data units, comprising:

first storage means for storing a reception count, which is the number of simultaneously-occurring messages, for each of subscribers corresponding to the subscriber identification information;

second storage means for storing a predetermined number of the simultaneously-occurring messages, which is an upper limit of allowing the messages to occur in parallel, for each of the subscribers corresponding to the subscriber identification information;

third storage means for storing each piece of the message identification information corresponding to each of the simultaneously-occurring messages, together with the order of occurrence, for each of the subscribers corresponding to the subscriber identification information; and control means for controlling transfers of the simultaneously-occurring messages, by controlling said first, second, and third storage means according to the transfer order identification information, the subscriber identification information, and the message identification information extracted from a received data unit.

2. The simultaneously-occurring message control unit according to claim 1, wherein:

if the transfer order identification information extracted from the received data unit indicates that the received data unit is the first data unit in the message corresponding to the received data unit, if the transfer order identification information extracted from the received data unit indicates that the whole of the message corresponding to the received data unit is included in the received data unit, and if the transfer order identification information extracted from the received data unit indicates that the received data unit is the last data unit in the message corresponding to the received data unit, said control means controls a duplication of the message identification information in the simultaneously-occurring messages, by determining whether or not the message identification information corresponding to the message identification information extracted from the received data unit is stored in said third storage means for the subscriber indicated by the subscriber identification information extracted from the received data unit, and updating the contents of said third and first storage means according to the determination result.

3. The simultaneously-occurring message control unit according to claim 1, wherein:

if the transfer order identification information extracted from the received data unit indicates that the received data unit is the first data unit in the message corresponding to the received data unit, if the transfer order identification information extracted from the received data unit indicates that the whole of the message corresponding to the received data unit is included in the received data unit, and if the transfer order identification information extracted from the received data unit indicates that the received data unit is the last data unit in the message corresponding to the received data unit, said control means controls the number of the simultaneously-occurring messages, by comparing the reception count stored in said first storage means corresponding to the subscriber indicated by the subscriber identification information extracted from the received data unit with the predetermined number of the simultaneously-occurring messages stored in said second storage means corresponding to the subscriber indicated by the subscriber identification information extracted from the received data unit, and updating the contents of said third and first storage means according to the comparison result.

4. The simultaneously-occurring message control unit according to claim 1, wherein:

said communications system performs a switched multi-megabit data service which transmits one message of the subscriber using one or the plurality of data units.

5. The simultaneously-occurring message control unit according to claim 4, wherein:

the data unit is a level 2 protocol data unit in the switched multi-megabit data service; and the message is a level 3 protocol data unit in the switched multi-megabit data service.

6. A simultaneously-occurring message control method in a communications system where one message of a subscriber is transmitted using one or a plurality of data units, each of which is attached with subscriber identification information for identifying the subscriber, message identification information for identifying the message corresponding to the one or the plurality of data units, and transfer order identification information for identifying an order of transferring the one or the plurality of data units in the message corresponding to the one or the plurality of data units, comprising the steps of:

storing a reception count, which is the number of simultaneously-occurring messages, in a first memory for each of subscribers corresponding to the subscriber identification information;

storing a predetermined number of the simultaneously-occurring messages, which is an upper limit of allowing the messages to occur in parallel, in a second memory for each of the subscribers corresponding to the subscriber identification information;

storing each piece of the message identification information corresponding to each of the simultaneously-occurring messages, in a third memory together with the order of occurrence, for each of the subscribers corresponding to the subscriber identification information; and controlling transfers of the simultaneously-occurring messages, by controlling said first, second, and third memories according to the transfer order identification information, the subscriber identification information, and the message identification information extracted from a received data unit.

7. The simultaneously-occurring message control method according to claim 6, wherein:

if the transfer order identification information extracted from the received data unit indicates that the received data unit is the first data unit in the message corresponding to the received data unit, if the transfer order identification information extracted from the received data unit indicates that the whole of the message corresponding to the received data unit is included in the received data unit, and if the transfer order identification information extracted from the received data unit indicates that the received data unit is the last data unit in the message corresponding to the received data unit, a duplication of the message identification information in the simultaneously-occurring messages is controlled by determining whether or not the message identification information corresponding to the message identification information extracted from the received data unit is stored in said third memory for the subscriber indicated by the subscriber identification information extracted from the received data unit, and updating the contents of said third and first memories according to the determination result.

8. The simultaneously-occurring message control method according to claim 6, wherein:

if the transfer order identification information extracted from the received data unit indicates that the received data unit is the first data unit in the message corresponding to the received data unit, if the transfer order identification information extracted from the received data unit indicates that the whole of the message corresponding to the received data unit is included in the received data unit, and if the transfer order identification information extracted from the received data unit indicates that the received data unit is the last data unit in the message corresponding to the received data unit, the number of the simultaneously-occurring messages is controlled by comparing the reception count stored in said first memory corresponding to the subscriber indicated by the subscriber identification information extracted from the received data unit with the predetermined number of the simultaneously-occurring messages stored in said second memory corresponding to the subscriber indicated by the subscriber identification information extracted from the received data unit, and updating the contents of said third and first memories according to the comparison result.

9. The simultaneously-occurring message control method according to claim 6, wherein:

said communications system performs a switched multi-megabit data service which transmits one message of the subscriber using one or the plurality of data units.

10. The simultaneously-occurring message control method according to claim 9, wherein:

the data unit is a level 2 protocol data unit in the switched multi-megabit data service; and the message is a level 3 protocol data unit in the switched multi-megabit data service.

* * * * *